US010240666B2

(12) United States Patent
Hoefken

(10) Patent No.: US 10,240,666 B2
(45) Date of Patent: Mar. 26, 2019

(54) SIMPLIFIED GEARBOX MECHANISM

(71) Applicant: Motus Labs, LLC, Dallas, TX (US)

(72) Inventor: Carlos A. Hoefken, Dallas, TX (US)

(73) Assignee: Motus Labs, LLC, Dallas, TX (US)

( * ) Notice: Subject to any disclaimer, the term of this patent is extended or adjusted under 35 U.S.C. 154(b) by 0 days.

(21) Appl. No.: 16/111,344

(22) Filed: Aug. 24, 2018

(65) Prior Publication Data
US 2018/0363745 A1 Dec. 20, 2018

Related U.S. Application Data

(63) Continuation-in-part of application No. 14/995,094, filed on Jan. 13, 2016, which is a continuation of application No. 13/795,488, filed on Mar. 12, 2013, now Pat. No. 9,261,176.

(51) Int. Cl.
F16H 25/06 (2006.01)
(52) U.S. Cl.
CPC ........ F16H 25/06 (2013.01); *Y10T 74/18296* (2015.01)
(58) Field of Classification Search
CPC ........... F16H 25/06; F16H 25/04; F16H 25/02
See application file for complete search history.

(56) References Cited

U.S. PATENT DOCUMENTS

| | | | |
|---|---|---|---|
| 58,740 A * | 10/1866 | Goodman | F16H 31/004 74/122 |
| 1,666,458 A | 4/1928 | Leland | |
| 2,134,603 A * | 10/1938 | Crosman | B41J 19/64 74/122 |
| 2,167,590 A | 7/1939 | Slaugenhop | |
| 2,521,067 A * | 9/1950 | Kenison | F16H 29/06 74/117 |
| 3,088,333 A | 5/1963 | Walton | |
| 3,386,298 A * | 6/1968 | Klingler | B30B 15/00 173/170 |
| 3,913,417 A * | 10/1975 | Vangor | B23Q 16/065 74/122 |
| 4,075,893 A | 2/1978 | Koch | |
| 4,743,763 A | 5/1988 | Cutburth et al. | |
| 6,109,136 A | 8/2000 | Dold | |

(Continued)

*Primary Examiner* — David M Fenstermacher
(74) *Attorney, Agent, or Firm* — Jeffrey G. Degenfelder; Carstens & Cahoon, LLP

(57) ABSTRACT

The improved gearbox mechanism of the present invention includes a plurality of cam-actuated simplified gear block assemblies, which transfer power from a power shaft to a secondary or output gear element. Each gear block assembly includes a gear block having a surface that periodically interfaces with a secondary or output gear element. In a preferred embodiment the interface surface comprises a plurality of projections or teeth which correspond to complementary projections or gear teeth on the output gear element. Each gear block assembly further includes a gear block, a torque lever arm, cam followers and/or a socket, which connect or link the gear block to a cam assembly, which in turn is connected to a power source. The cam assembly includes about its circumference a unique pathway or groove for each linkage assembly of a particular gear block assembly so that the movement of the gear block may be controlled in two dimensions in accordance with a certain design parameter.

30 Claims, 20 Drawing Sheets

(56) References Cited

U.S. PATENT DOCUMENTS

| | | |
|---|---|---|
| 6,202,509 B1 | 3/2001 | Dold |
| 6,220,115 B1 | 4/2001 | Him et al. |
| 6,805,025 B2 | 10/2004 | Ruttor |
| 7,086,309 B2 | 8/2006 | Stoianovici et al. |
| 7,211,016 B2 | 5/2007 | Yan et al. |
| 8,516,981 B2 | 8/2013 | Jacques et al. |
| 8,534,151 B2 * | 9/2013 | Johnson ................. F16D 11/10 399/167 |
| 8,998,763 B2 | 4/2015 | Wengenroth |
| 9,261,176 B2 | 2/2016 | Hoefken |
| 9,327,618 B2 | 5/2016 | Villarroel et al. |
| 9,394,984 B2 | 7/2016 | Balsiger |
| 2003/0047025 A1 | 3/2003 | Ruttor |
| 2011/0298322 A1 | 12/2011 | Sherwin et al. |
| 2012/0289372 A1 | 11/2012 | Wengenroth |
| 2013/0255421 A1 | 10/2013 | Schmidt et al. |
| 2014/0015382 A1 | 1/2014 | Kim |
| 2014/0232159 A1 | 8/2014 | Villarroel et al. |
| 2014/0260721 A1 * | 9/2014 | Hoefken ................. F16H 25/06 74/55 |
| 2016/0131232 A1 | 5/2016 | Hoefken |
| 2016/0153535 A1 | 6/2016 | Yang et al. |

* cited by examiner

SIMPLIFIED GEARBOX MECHANISM

CROSS-REFERENCE TO RELATED APPLICATION

This application is a continuation-in-part application of U.S. patent application Ser. No. 14/995,094 filed Jan. 13, 2016, which is a continuation application of U.S. patent application Ser. No. 13/795,488 filed Mar. 12, 2013 (now U.S. Pat. No. 9,261,176), the technical disclosures of which are hereby incorporated herein by reference.

BACKGROUND OF THE INVENTION

Technical Field of the Invention

The present invention relates to a universal gearbox mechanism featuring cam-actuated gear block assemblies that periodically engage the output gear causing power transfer. It has particular, but not exclusive, application for use in servomotor assemblies.

Description of the Related Art

Conventional machines typically consist of a power source and a power transmission system, which provides controlled application of the power. A variety of proposals have previously been made in the art of power transmission systems. The simplest transmissions, often called gearboxes to reflect their simplicity (although complex systems are also called gearboxes in the vernacular), provide gear reduction (or, more rarely, an increase in speed), sometimes in conjunction with a change in direction of the powered shaft. A transmission system may be defined as an assembly of parts including a speed-changing gear mechanism and an output shaft by which power is transmitted from the power source (e.g., electric motor) to an output shaft. Often transmission refers simply to the gearbox that uses gears and gear trains to provide speed and torque conversions from a power source to another device.

Gearboxes have been used for many years and they have many different applications. In general, conventional gearboxes comprise four main elements: power source; drive train; housing and output means. The power source places force and motion into the drive train. The power source may be a motor connected to the drive train through suitable gearing, such as a spur, bevel, helical or worm gear.

The drive train enables the manipulation of output motion and force with respect to the input motion and force provided by the power source. The drive train typically comprises a plurality of gears of varying parameters such as different sizes, number of teeth, tooth type and usage, for example spur gears, helical gears, worm gears and/or internal or externally toothed gears.

The gearbox housing is the means which retains the internal workings of the gearbox in the correct manner. For example it allows the power source, drive train and output means to be held in the correct relationship for the desired operation of the gearbox. The output means is associated with the drive train and allows the force and motion from the drive train to be applied for an application. Usually, the output means exits the gearbox housing.

The output means typically can be connected to a body whereby the resultant output motion and force from the drive train is transmitted via the output means (e.g., an output shaft) to the body to impart the output mean's motion and force upon the body. Alternatively, the output means can impart the motion and force output from the drive train to the gearbox housing whereby the output means is held sufficiently as to allow the gearbox housing to rotate.

Rotating power sources typically operate at higher rotational speeds than the devices that will use that power. Consequently, gearboxes not only transmit power but also convert speed into torque. The torque ratio of a gear train, also known as its mechanical advantage, is determined by the gear ratio. The energy generated from any power source has to go through the internal components of the gearbox in the form of stresses or mechanical pressure on the gear elements. Therefore, a critical aspect in any gearbox design comprises engineering the proper contact between the intermeshing gear elements. These contacts are typically points or lines on the gear teeth where the force concentrates. Because the area of contact points or lines in conventional gear trains is typically very low and the amount of power transmitted is considerable, the resultant stress along the points or lines of contact is in all cases very high. For this reason, designers of gearbox devices typically concentrate a substantial portion of their engineering efforts in creating as large a line of contact as possible or create as many simultaneous points of contacts between the two intermeshed gears in order to reduce the resultant stress experienced by the respective teeth of each gear.

Another important consideration in gearbox design is minimizing the amount of backlash between intermeshing gears. Backlash is the striking back of connected wheels in a piece of mechanism when pressure is applied. In the context of gears, backlash (sometimes called lash or play) is clearance between mating components, or the amount of lost motion due to clearance or slackness when movement is reversed and contact is re-established. For example, in a pair of gears backlash is the amount of clearance between mated gear teeth.

Theoretically, backlash should be zero, but in actual practice some backlash is typically allowed to prevent jamming. It is unavoidable for nearly all reversing mechanical couplings, although its effects can be negated. Depending on the application it may or may not be desirable. Typical reasons for requiring backlash include allowing for lubrication, manufacturing errors, deflection under load and thermal expansion. Nonetheless, low backlash or even zero backlash is required in many applications to increase precision and to avoid shocks or vibrations. Consequently, zero backlash gear train devices are in many cases expensive, short lived and relatively heavy.

Weight and size are yet another consideration in the design of gearboxes. The concentration of the aforementioned stresses on points or lines of contact in the intermeshed gear trains necessitates the selection of materials that are able to resist those forces and stresses. However, those materials are oftentimes relatively heavy, hard and difficult to manufacture.

Thus, a need exists for an improved and more lightweight gearbox mechanism, which is capable of handling high stress loads in points or lines of contact between its intermeshed gears. Further, a need exists for an improved and more lightweight gearbox mechanism having low or zero backlash that is less expensive to manufacture and more reliable and durable.

SUMMARY OF THE INVENTION

The present invention overcomes many of the disadvantages of prior art gearbox mechanisms by utilizing a plurality of cam-actuated gear block assemblies to transfer power from a power shaft to a secondary or output gear element. In a first embodiment, each gear block assembly includes a gear block having a surface that periodically interfaces with a secondary or output gear element. In a preferred embodiment the interface surface comprises a plurality of projections or teeth which correspond to complementary projections or gear teeth on the output gear element. Each gear block assembly further includes a plurality of linkage assemblies, which connect or link the gear block to a cam assembly, which in turn is connected to a power source. The cam assembly includes about its circumference a unique pathway or groove for each linkage assembly of a particular gear block assembly so that the movement of the gear block may be controlled in two dimensions in accordance with a certain design parameter.

Each linkage assembly comprises a linkage mechanism, which at its proximal end is pivotally attached end to its respective gear block and at its distal end maintains contact with its respective pathway or groove formed in the cam assembly. In a preferred embodiment, each linkage mechanism includes two pivotally coupled connector arms. An upper connector arm includes a first pivot point that is pivotally coupled to its respective gear block element and a second pivot point pivotally coupled to a lower connector arm. The lower connector arm includes a cam follower element at its distal end that maintains contact with its respective pathway or groove formed in the cam assembly. The lower connector arm further includes a pivot point having a fixed axis of rotation relative to the central axis of rotation of the cam assembly.

In a preferred embodiment, each gear block assembly includes three linkage assemblies pivotally coupled to the gear block and in constant contact with the cam assembly. The gear block includes pivot bars configured on opposing ends that serve to pivotally couple the linkage assemblies to the gear block. Two linkage assemblies are coupled to a pivot bar on one end while a single linkage assembly is coupled to the pivot bar on the opposing end. Each of the linkage assemblies includes a pivot point that is rotatively coupled to a fixed axis of rotation relative to the central axis of rotation of the cam assembly. In one embodiment, this fixed pivot point comprises a pivot bar fixably contained between two stationary plates. Each of the linkage assemblies is biased so that its respective cam follower element maintains contact with the surface of its respective pathway or groove formed in the cam assembly throughout the rotation cycle of the cam assembly.

The gear block assembly is designed to drive its respective gear block through a two-dimensional circuit in response to rotation of the cam assembly. Broadly speaking, the two-dimensional circuit includes urging the gear block to engage a secondary or output gear element and move or rotate a specified quantum distance prior to disengaging from the output gear element, and returning back the specified quantum distance to again reengage the secondary or output gear element once again and repeat the process. The travel path or circuit of each gear block is controlled by adjusting the length and configuration of the various linkage assemblies and altering the pathways or grooves formed in the cam assembly.

When adapted to a gearbox mechanism a plurality of gear block assemblies are configured about a central axis of the cam assembly. The cam assembly is rotatively coupled with a power source. As the cam assembly rotates, the cam follower elements of the respective linkage assemblies of each gear block assembly maintain contact with a particular pathway or groove formed in the circumferential surface of the cam assembly. The variance of distance from the center of rotation of the different pathways or grooves of the cam assembly causes the respective linkage assemblies to work in concert to move their respective gear block through a predetermined circuit of movement. This predetermined circuit of movement of the gear block can be precisely calibrated to meet specific engineering requirements. For example, the torque ratio and speed reduction may be regulated and controlled by adjusting the circuit of movement of each gear block assembly.

A second embodiment of a gearbox mechanism of the present invention may include a main body, an output element, and a plurality of simplified gear block assemblies. Additionally, the gearbox mechanism may have a retainer that interfaces with the main body and the output element. Each simplified gear block assembly includes a gear block, a torque lever, cam follower(s), and/or socket (or a portion of a socket). The cam actuated gear block assemblies are configured about a central axis. The rotational force on the cam element allows for a driving or rotative force on the cam actuated gear block assemblies.

In a preferred embodiment, the torque lever also has a set of cam followers allowing for the following of a specified path formed along a planer surface of the cam element. The cam element includes at least one unique pathway or groove that interfaces with the cam follower of gear block or torque lever so that as the cam element rotates, the movement of the gear block or torque lever is controlled in two dimensions in accordance with at least one certain design parameter.

By varying the radius of the pathway or grooves on the cam element, the cam actuated gear block assemblies drive respective gear block(s) through a two-dimensional circuit in response to rotation of the cam element. Broadly speaking, the two-dimensional circuit includes urging the gear block to engage the output element and move and/or rotate the output element a specified distance prior to disengaging from the output element, and returning back the specified distance to again reengage the output element once again, and repeat the process. The travel path or circuit of each gear block is controlled by adjusting the length, width, height, and/or size of the respective gear block and/or torque lever and/or altering the pathways or grooves formed in the cam element. In a preferred embodiment, there is at least one pivot point for both the gear block and the torque lever that allows each to pivot separately from each other.

A third embodiment of the gearbox mechanism of the present invention may include a cam element, a main body and output element and a plurality of simplified gear block assemblies. In at least one example, the output element is retained within the main body by a retainer. The gear block assemblies are placed within the main body and interface with the output element and cam element. The gear block assemblies can include a torque lever, a gear block, a first cam follower, and a second cam follower. The cam followers follow pathways in the cam element to generate forces on the torque lever, and/or the gear block(s) generating a pivoting motion for the both the torque lever and the gear block(s). In at least one version, the pivoting motion can be generally square pivot path for the gear block(s). While in other versions, the pivot path of the gear block(s) will generally be oval or circular.

In at least one version, a central aperture aligned with a central axis may be a part of the gearbox mechanism. Each gear block assembly includes a gear block, a torque lever, and at least one cam follower, which connect the gear block to the planer surface of the cam element. The torque lever, and/or gear block can interact to be pivotally attached, and correspond to the interaction and/or engagement of the cam follower(s) with the cam element. The rotation of the output element may also be controlled through a reverse or tension engagement (i.e., negative bias) of gear block(s) that are not in a driving or positive bias rotational engagement in order to reduce and/or element backlash.

In at least one version, the main body provides a housing for the gear assemblies. The gear block assemblies rest and/or are supported by the main body retaining surface. The gear block(s) may also be retained and/or supported by the main body gear block interface surface. The torque lever(s) may also be supported and/or retained by the main body torque lever interface surface, and/or the main body torque lever void as defined by the main body. The pivoting motion of the torque lever can also coincide with a pivoting motion of the gear block that allows for the interfacing, engaging, and/or rotating of an output element.

Numerous embodiments of gearbox mechanisms are possible using the gear block assembly of the present invention. The plurality of gear block assemblies configured about the central axis of the cam assembly can comprise either an odd or even number of gear block assemblies. At least two, and preferably three gear block assemblies are required for a gearbox mechanism of the present invention. The movement of the gear block assemblies typically move in a rotational series to one another. At least one gear block assembly is always engaged with the output gear element at any particular instance in time. Preferably, only one gear block assembly is disengaged with the output gear element at any particular instance in time. However, in another preferred embodiment wherein the plurality of gear block assemblies comprises four or more even-numbered gear block assemblies, the gear block assemblies configured on opposing sides of the cam assembly engage and disengage in unison from the secondary or output gear element.

The design of the gear block assemblies of the present invention enable a greater number of gear teeth to engage the output gear at any given time, thereby spreading the stresses associated therein across a greater area. By dramatically increasing the contact area between the gear block and the output gear at any given time the mechanical stress level is significantly decreased. In addition, the gear block assemblies of the present invention reduce backlash to zero and even preloaded conditions to create a tight connection between the power source and the powered device. This is an extremely desirable feature especially for high vibration applications. By reducing backlash to zero or preloaded condition, the mechanical impedance may also be reduced at a broad range of high vibration frequencies. Moreover, because the stresses associated with engagement of the gear block against the output gear are distributed across a greater area, the gear block mechanism may be manufactured of lighter weight, more flexible materials, which are less expensive and easier to manufacture, with no degradation in reliability. Indeed, using flexible materials further reduces the mechanical impedance at low frequencies. By reducing its weight and size, the gearbox mechanism of the present invention is adaptable to a broad range of applications that were previously impractical because of weight and space limitations.

BRIEF DESCRIPTION OF THE DRAWINGS

A more complete understanding of the method and apparatus of the present invention may be had by reference to the following detailed description when taken in conjunction with the accompanying drawings, wherein.

Figure 1A:
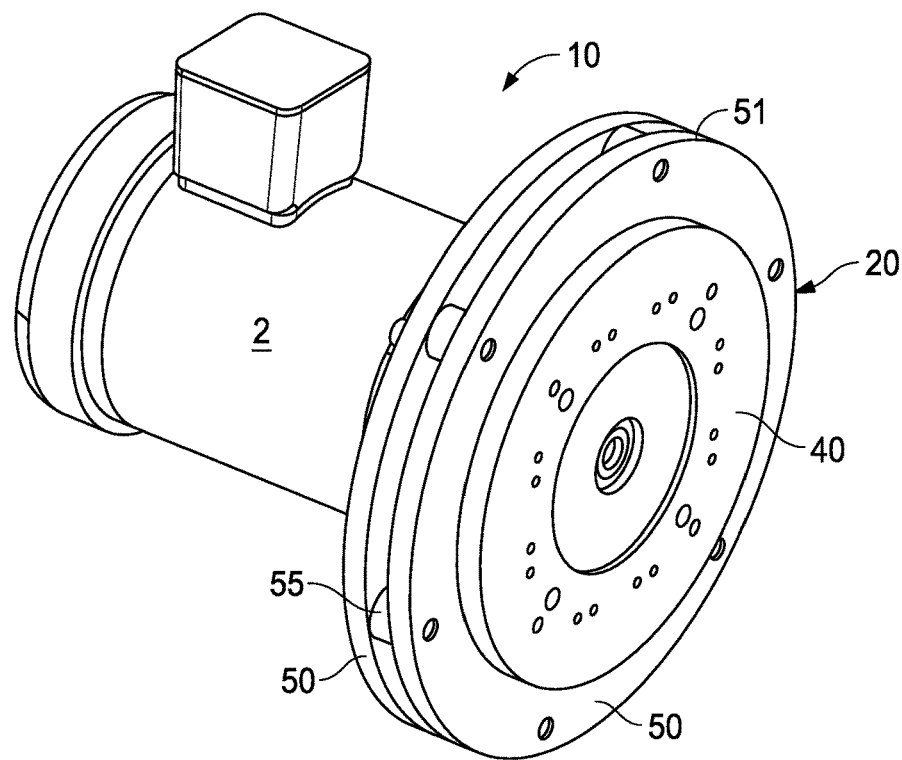
FIG. 1A is a perspective view of a first embodiment of the gearbox mechanism of the present invention attached to a power source.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1B:
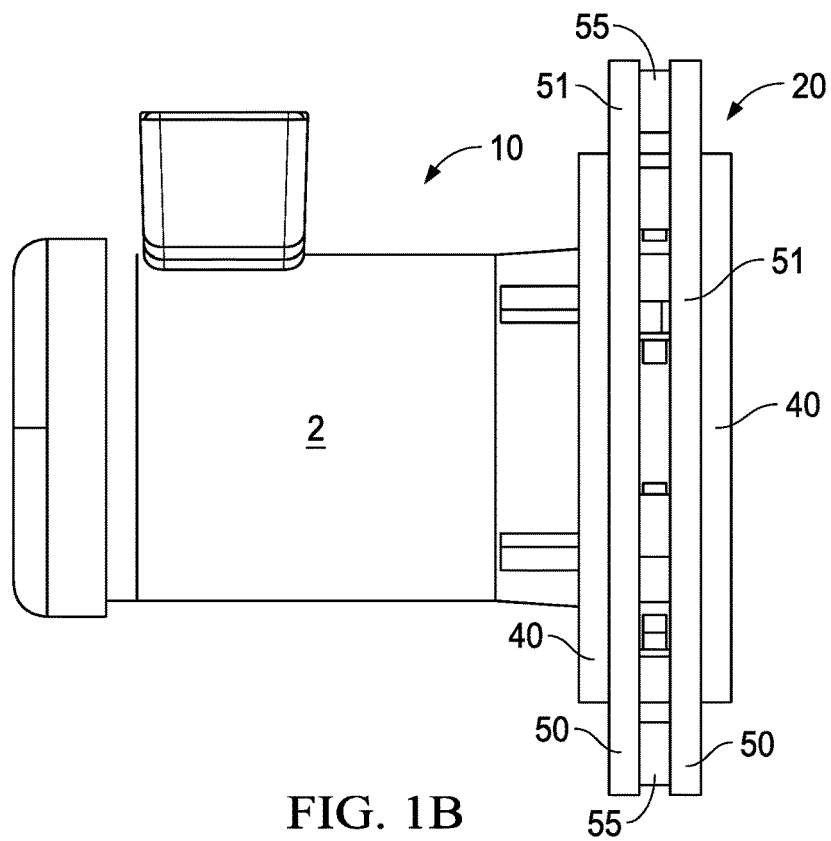
FIG. 1B is a side elevation view thereof.
Figure 2:
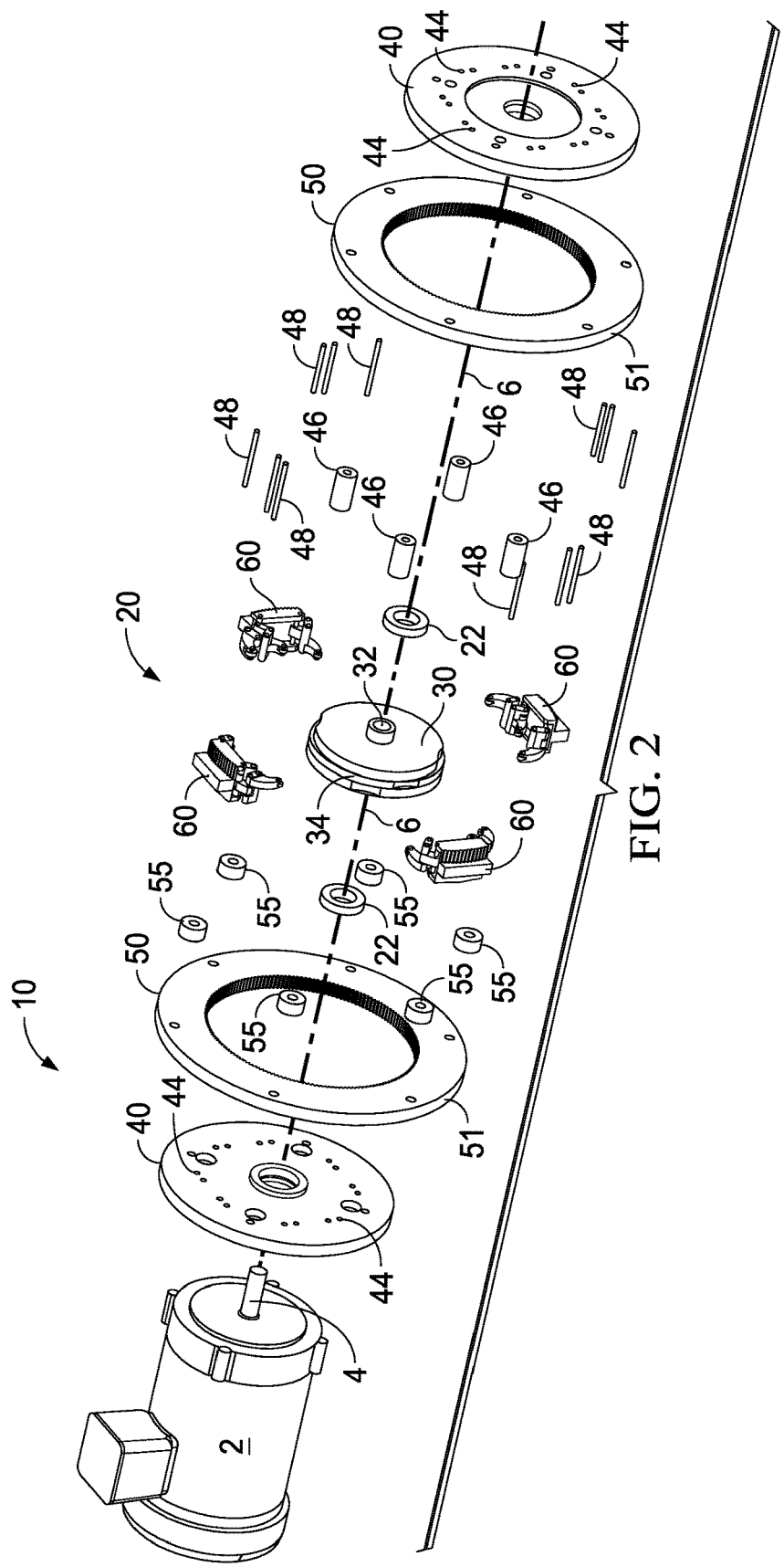
FIG. 2 is an exploded perspective view thereof.

With reference to the Figures, and in particular FIGS. 1A, 1B and 2, an embodiment of a machine 10 utilizing the gearbox mechanism 20 of the present invention is depicted. The machine 10 includes a power source or actuator 2, which includes an output device 4 that transmits the power generated by the power source 2. While the embodiment shown in the Figure generally depicts the power source 2 as an electric motor and the output device 4 as an output shaft of the electric motor, it is understood that there are numerous possible embodiments. For example, output device 4 need not be directly connected to the power source 2 but may be rotatively coupled by means of gears, chains, belts or magnetic fields. Likewise, the power source 2 may comprise an electric motor, an internal combustion engine, or any conventional power source that can be adapted to generate rotative power in an output device 4. Moreover, the power source 2 may also comprise the output gear of a preceding gear train mechanism.

The output device 4 comprises a central shaft that connected to the gearbox mechanism 20 through a central aperture 32 in the cam assembly 30 of the gearbox mechanism 20. The gearbox mechanism 20 is configured about the central axis 6 of the central shaft of the output device and comprises two stationary plates 40 between which are configured an output or power gear 50, a cam assembly 30 and a plurality of cam-actuated gear block assemblies 60, which transfer power from the cam assembly 30 to an output or power gear element 50. Two bearing assemblies 22 isolate the cam assembly 30 from the stationary plates 40 so that the cam assembly 30 can rotate freely between the two stationary plates 40. Likewise, spacer elements 46 configured between the two stationary plates 40 ensure that movement of the power gear element 50 is not impeded by the stationary plates 40. The gear block assemblies 60 are evenly spaced about the circumference of the cam assembly 30. Each gear block assembly 60 includes a gear block 62 and a plurality of linkage assemblies, which connect the gear block 62 to the outer circumferential surface of the cam assembly 30. Each linkage assembly comprises a linkage mechanism, which at its proximal end is pivotally attached to its respective gear block 62 and at its distal end includes a cam follower element, which maintains contact with its respective pathway or groove formed in the circumferential surface 34 of the cam assembly 30. Each linkage assembly includes a fixed axis pivot point that is connected to the two stationary plates 40. While each linkage assembly can pivot about its respective fixed axis pivot point 48 the alignment and configuration of the pivot point remains fixed in relation to the two stationary plates 40.

As shown in the embodiment depicted in the Figures, the plurality of cam-actuated gear block assemblies 60 transfer power from the power shaft 4 to an annular secondary or output gear element 50. In a preferred embodiment, each gear block assembly 60 includes a gear block 62 having an interface surface 63 (e.g., a plurality of projections or teeth 66) which correspond to a complementary interface surface 54 (e.g., projections or gear teeth) configured on an inner circumferential surface 53 of the annular secondary or output gear element 50. It is understood that the interface between the gear block 62 and the inner circumferential surface 53 of the output gear element 50 of the present invention comprises not only the preferred gear teeth as depicted, but also any complementary arrangement such as pins and holes or even friction fit surfaces.

While the annular output or power gear element 50 is depicted as two circular rings held apart by spacer elements 55, it is understood that the output or power gear element 50 may comprise a single circular ring. The output or power gear element 50 includes apertures or holes 58 for attaching to an output shaft or power takeoff (not shown). In addition, it is understood that the outer circumference 51 of the output or power gear element 50 may also comprise a surface to interface with some other gear train mechanism.

In addition, it is understood that the gear block 62 may include a divider/alignment block 68 dividing the interface surface 63 into two separate sections. The variant of the gear block 62 featuring the alignment block 68 is particularly suitable to embodiments which feature output or power gear elements 50 comprised of two circular rings.

The gear blocks 62 of the present invention are specifically designed to enable a greater surface area (e.g., greater number of gear teeth) to engage the output gear 50 at any given time, thereby spreading the stresses associated therein across a greater area. By dramatically increasing the contact area between the gear block 62 and the output gear 50 at any given time the mechanical stress level is significantly decreased. In addition, the gear block 62 assemblies of the present invention reduce backlash to zero and even pre-loaded conditions to create a tight connection between the power source 2 and the powered device. This is an extremely desirable feature especially for high vibration applications. Moreover, because the stresses associated with engagement of the gear block 62 against the output gear 50 are distributed across a greater area, the gear block 62 may be manufactured of lighter weight materials, which are typically less expensive and easier to manufacture, with no degradation in reliability. For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism of the present invention is adaptable to a broad range of applications that were previously impractical because of weight and space limitations.

The cam assembly 30 is coupled to the power source 2 by means of the output device or power shaft 4. Thus, power generated by the power source 2 is transferred to the power shaft 4, which causes the cam assembly 30 to rotate about the central axis 6. The cam assembly 30 includes about its circumferential surface 34 a plurality of unique pathways or grooves which each interface with the cam follower element of a single linkage assembly of each gear block assembly 60 so that as the cam assembly 30 rotates, the movement of the gear block 62 is controlled in two dimensions in accordance with a certain design parameter. By varying the radius of the pathway or grooves on the cam assembly 30 the linkage assemblies of the gear block assembly 60 drive respective gear block 62 through a two-dimensional circuit in response to rotation of the cam assembly 30. Broadly speaking, the two-dimensional circuit includes urging the gear block to engage the output gear element 50 and move or rotate the output gear element 50 a specified quantum distance prior to disengaging from the output gear element 50, and returning back the specified quantum distance to again reengage the output gear element 50 once again and repeat the process. The travel path or circuit of each gear block 62 is controlled by adjusting the length and configuration of the various linkage assemblies and altering the pathways or grooves formed in the cam assembly 30.

In a preferred embodiment, each linkage mechanism includes two pivotally coupled connector arms. An upper connector arm includes a first pivot point that is pivotally coupled to its respective gear block 62 and a second pivot point pivotally coupled to a lower connector arm. The lower connector arm includes a cam follower element at its distal end that maintains contact with its respective pathway or groove formed in the cam assembly 30. The lower connector arm further includes a pivot point having a fixed axis of rotation relative to the central axis 6 of rotation of the cam assembly 30.

With reference now to FIGS. 4A-4D, a preferred embodiment of the gear block assembly 60 is shown. In the depicted preferred embodiment, each gear block assembly 60 includes three linkage assemblies 70, 80, 90, which are each pivotally coupled to the gear block 62 and include a cam follower element 74, 84, 94, respectively, which maintain constant contact with the cam assembly 30. The gear block 62 includes pivot bars configured on opposing ends that serve to pivotally couple the linkage assemblies 70, 80, 90 to the gear block 62. For example, two linkage assemblies 70, 80 are pivotally coupled to a pivot bar 64a on one end while a single linkage assembly 90 is pivotally coupled to the pivot bar 64b on the opposing end. Each of the linkage assemblies 70, 80, 90 includes a pivot point 78, 88, 98, respectively, that is rotatively coupled to a fixed axis of rotation relative to the central axis 6 of rotation of the cam assembly 30. As depicted, each fixed axis of rotation comprises a pivot pin 48 that is secured in matching alignment holes 44 configured in the two stationary plates 40. While each of the linkage assemblies 70, 80, 90 can pivot about its respective fixed axis pivot point 78, 88, 98, respectively, the alignment and configuration of the pivot points remains fixed in relation to the two stationary plates 40. Each of the linkage assemblies 70, 80, 90 is biased so that its respective cam follower element 74, 84, 94, respectively, maintains contact with the surface of its respective pathway or groove formed in the cam assembly 30 throughout the rotation cycle of the cam assembly 30.

In the depicted preferred embodiment, each of the linkage assemblies may further comprise at least two connector arms. For example, the first linkage assembly 70 may include a lower connector arm 72 that is pivotally connected to an upper connector arm 74, which is also pivotally connected to the gear block 62. A pivot pin 71 serves to pivotally connect the lower connector arm 72 to the upper connector arm 74. The lower connector arm 72 includes a cam follower element 74 at its distal end. In a preferred embodiment the cam follower element 74 comprises a bearing wheel 75 rotatively coupled at the distal end of the lower connector arm by means of an axle 76. The lower connector arm 72 further includes a pivot point 78 that is rotatively coupled to a fixed axis of rotation relative to the central axis 6 of rotation of the cam assembly 30. For example, a pivot pin 48a secured in matching alignment holes 44 configured in the two stationary plates 40 serves as a fixed axis of rotation relative to the central axis 6 of rotation of the cam assembly 30. While the lower connector arm 72 may pivot about its fixed axis pivot point 78, the alignment and configuration of the pivot point 78 remains fixed in relation to the two stationary plates 40. Each of the pivotal connections in the first linkage assembly 70 is biased so that the cam follower element 74 maintains contact with the surface of its respective pathway or groove 36 formed in the circumferential surface 34 of the cam assembly 30 throughout the rotation cycle of the cam assembly 30. For example, the pivotal connections may further include torsional spring elements (not shown) which bias the first linkage assembly 70 so that the cam follower element 74 maintains contact with the surface of its respective pathway or groove 36 formed in the circumferential surface 34 of the cam assembly 30 throughout the rotation cycle of the cam assembly 30. Alternatively, the cam follower element of each linkage assembly may include conjugate cams to bias the pivotal connections in the linkage assembly. Alternatively or in addition, a ring spring connecting all of the gear blocks 62 in a gear train may be used as a biasing mechanism in accordance with the present invention.

Similarly, the second linkage assembly 80 may include a lower connector arm 82 that is pivotally connected to an upper connector arm 84, which is also pivotally connected to the gear block 62. The upper connector arm 84 is pivotally connected to the gear block 62 by means of the same pivot bar 64a used to pivotally connect the upper connector arm 74 of the first linkage assembly 70. A pivot pin 81 serves to pivotally connect the lower connector arm 82 to the upper connector arm 84. The lower connector arm 82 includes a cam follower element 84 at its distal end. In a preferred embodiment the cam follower element 84 comprises a bearing wheel 85 rotatively coupled at the distal end of the lower connector arm by means of an axle 86. The lower connector arm 82 further includes a pivot point 88 that is rotatively coupled to a fixed axis of rotation relative to the central axis 6 of rotation of the cam assembly 30. For example, a pivot pin 48b secured in matching alignment holes 44 configured in the two stationary plates 40 serves as a fixed axis of rotation relative to the central axis 6 of rotation of the cam assembly 30. While the lower connector arm 82 may pivot about its fixed axis pivot point 88, the alignment and configuration of the pivot point 88 remains fixed in relation to the two stationary plates 40. Each of the pivotal connections in the second linkage assembly 80 is biased so that the cam follower element 84 maintains contact with the surface of its respective pathway or groove 37 formed in the circumferential surface 34 of the cam assembly 30 throughout the rotation cycle of the cam assembly 30. For example, the pivotal connections may further include torsional spring elements (not shown) which bias the second linkage assembly 80 so that the cam follower element 84 maintains contact with the surface of its respective pathway or groove 37 formed in the circumferential surface 34 of the cam assembly 30 throughout the rotation cycle of the cam assembly 30. Alternatively or in addition, a ring spring connecting all of the gear blocks 62 in a gear train may be used as a biasing mechanism in accordance with the present invention.

Likewise, the third linkage assembly 90 may include a lower connector arm 92 that is pivotally connected to an upper connector arm 94, which is also pivotally connected to the gear block 62. The upper connector arm 94 of the third linkage assembly 90 is pivotally coupled to a pivot bar 64b configured on the opposing end of the gear block 62 as the pivot bar 64a to which the upper connector arms 74, 84 of the first and second linkage assemblies 70, 80 are rotatively coupled. A pivot pin 91 serves to pivotally connect the lower connector arm 92 to the upper connector arm 94. The lower connector arm 92 includes a cam follower element 94 at its distal end. In a preferred embodiment the cam follower element 94 comprises a bearing wheel 95 rotatively coupled at the distal end of the lower connector arm by means of an axle 96. The lower connector arm 92 further includes a pivot point 98 that is rotatively coupled to a fixed axis of rotation relative to the central axis 6 of rotation of the cam assembly 30. For example, a pivot pin 48c secured in matching alignment holes 44 configured in the two stationary plates 40 serves as a fixed axis of rotation relative to the central axis 6 of rotation of the cam assembly 30. While the lower connector arm 92 may pivot about its fixed axis pivot point 98, the alignment and configuration of the pivot point 98 remains fixed in relation to the two stationary plates 40. Each of the pivotal connections in the second linkage assembly 90 is biased so that the cam follower element 94 maintains contact with the surface of its respective pathway or groove 38 formed in the circumferential surface 34 of the cam assembly 30 throughout the rotation cycle of the cam assembly 30. For example, the pivotal connections may further include torsional spring elements (not shown) which bias the second linkage assembly 90 so that the cam follower element 94 maintains contact with the surface of its respective pathway or groove 38 formed in the circumferential surface 34 of the cam assembly 30 throughout the rotation cycle of the cam assembly 30. Alternatively or in addition, a ring spring connecting all of the gear blocks 62 in a gear train may be used as a biasing mechanism in accordance with the present invention.

Figure 5:
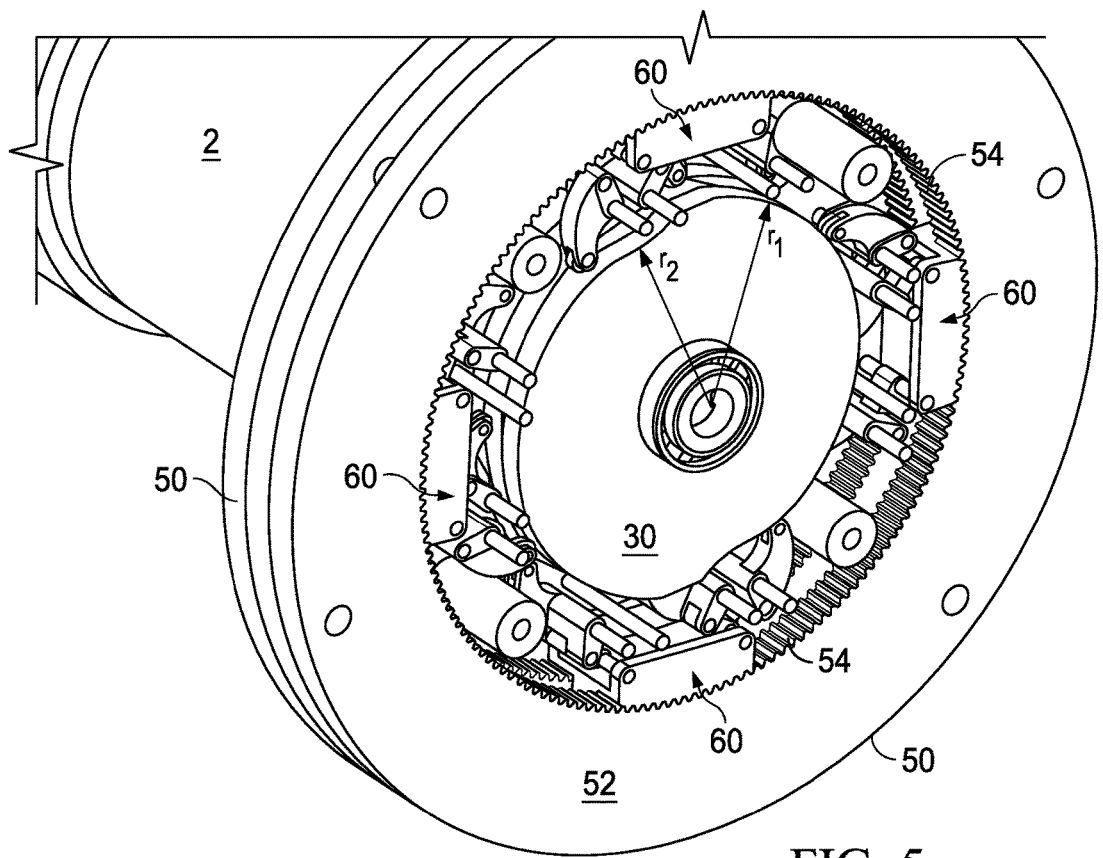
FIG. 5 is a perspective view of the embodiment of the gearbox mechanism shown in FIG. 3A.
Figure 6:
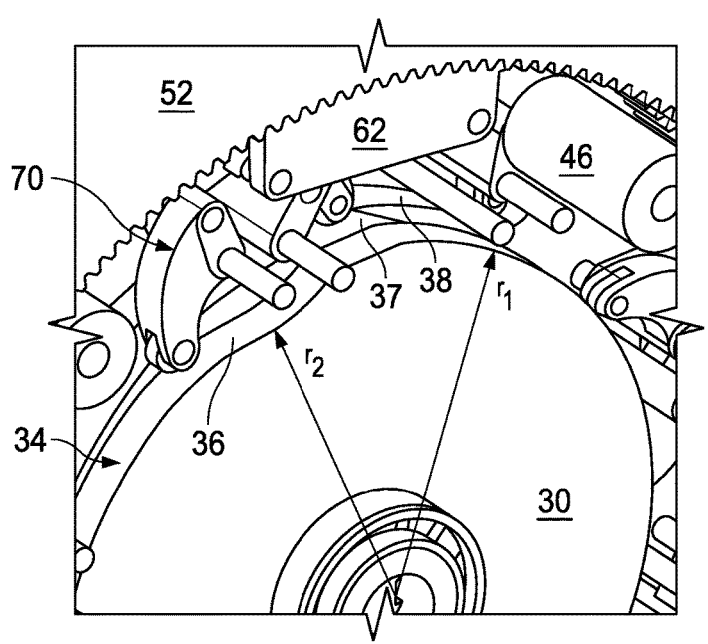
FIG. 6 is a close-up perspective view of a gear block assembly shown in FIG. 5.

Each of the linkage assemblies 70, 80, 90 is biased so that its respective cam follower element 74, 84, 94 maintains contact with the surface of its respective pathway or groove formed in the cam assembly 30 throughout the rotation cycle of the cam assembly 30. For example, cam follower element 74 maintains contact with the surface of a first pathway 36, cam follower element 84 maintains contact with the surface of a second pathway 37, and cam follower element 94 maintains contact with the surface of a third pathway 38. Each pathway has a unique circumference, the radius of which varies over the course of the pathway. Thus, for example as shown in FIGS. 5 and 6, the first pathway 36 has a first radius $r_1$ at one part of its circumference that is greater than a second radius $r_2$ at another part of its circumference. This creates a unique, undulating path for each pathway as the cam assembly 30 rotates. While the cam assembly 30 depicted in the Figures, appears to be a single disc or unit having a plurality of pathways or grooves formed in the circumferential surface 34 of the cam assembly 30, it is understood that the cam assembly 30 may also comprise a plurality of separate discs, each having a unique pathway formed in its circumferential surface, which are mechanically coupled to one another to assemble a single cam assembly 30.

As the cam assembly 30 rotates, the cam follower element follows its respective pathway maintaining contact with the circumferential surface of the respective pathway. As the radius of the pathway changes, the respective linkage assembly pivots about its fixed axis pivot point to compensate. This pivoting of the linkage assembly about its fixed axis pivot point induces similar movement in the pivotal connection with the gear block 62, which results in movement of the gear block 62. Thus, as the cam assembly 30 rotates, the movement of the gear block 62 is controlled by the induced pivoting of the plurality linkage assemblies. For example, by varying the radius of the first pathway or groove 36 on the cam assembly 30, the first linkage assembly 70 pivots about its fixed axis pivot point 78 to compensate and maintain contact between the first cam follower 74 and the surface of the first pathway or groove 36. This pivoting of the first linkage assembly 70 about its fixed axis pivot point 78 induces movement in the pivotal connection with the gear block 62. Each linkage assembly acts independently of the other linkage assemblies due to the cam follower element of each linkage assembly following a distinct pathway formed in the circumferential surface of the cam assembly.

Figure 4A:
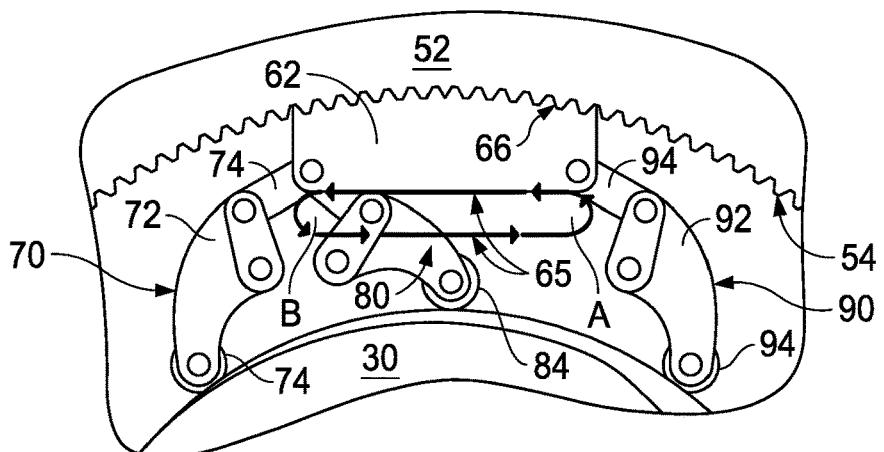
FIG. 4A is a close-up side elevation view of a gear block assembly shown in FIG. 3A.
Figure 4B:
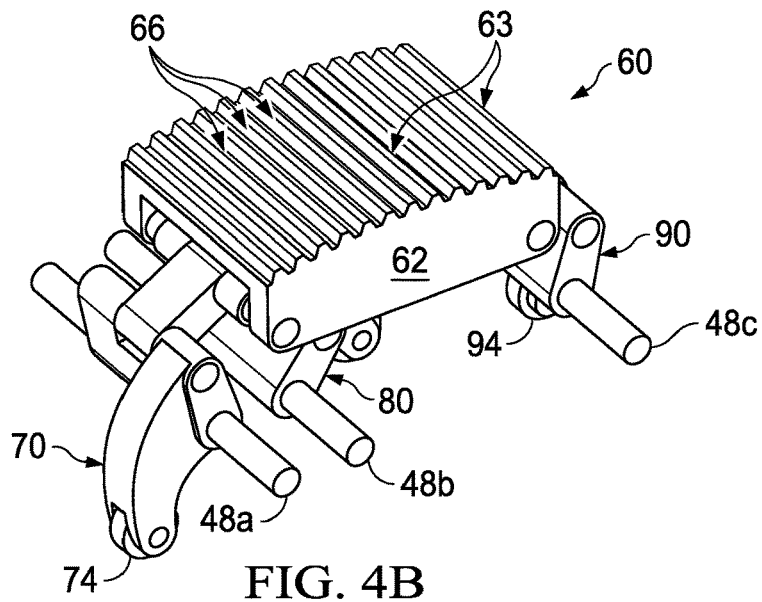
FIG. 4B is a perspective view of a gear block assembly shown in FIG. 3A.
Figure 4C:
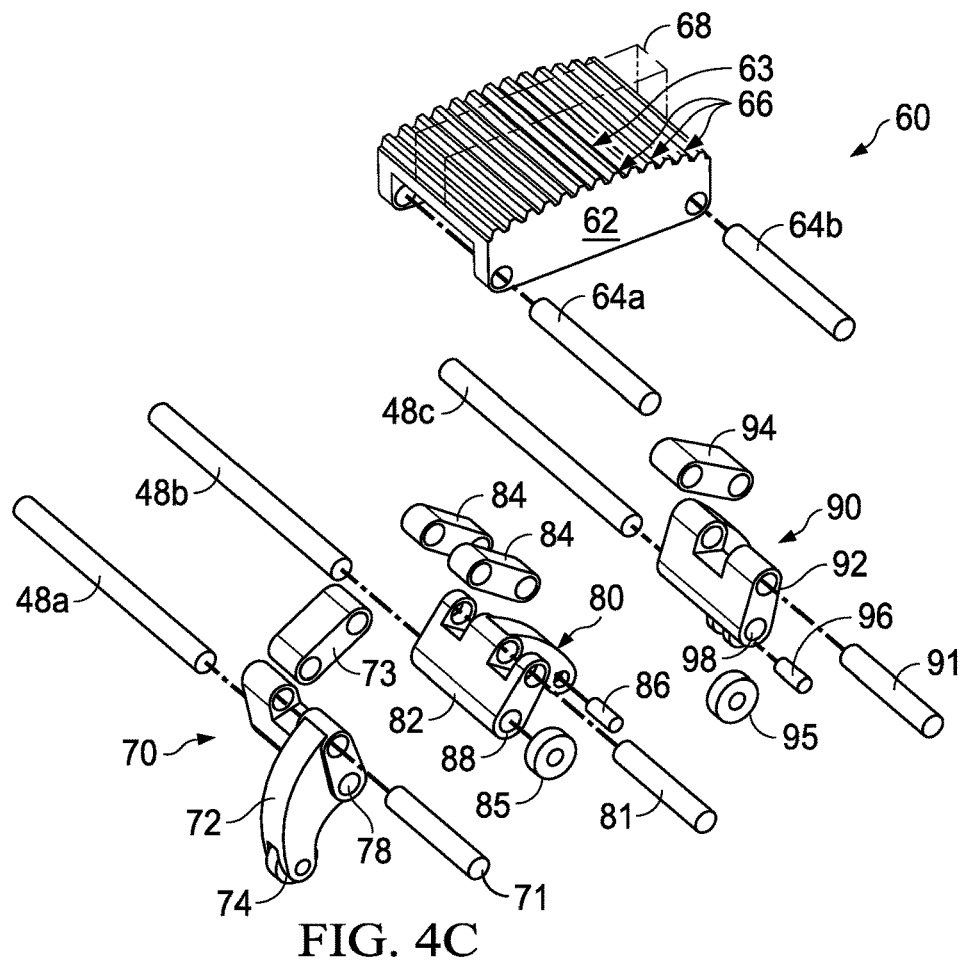
FIG. 4C is an exploded perspective view thereof.
Figure 4D:
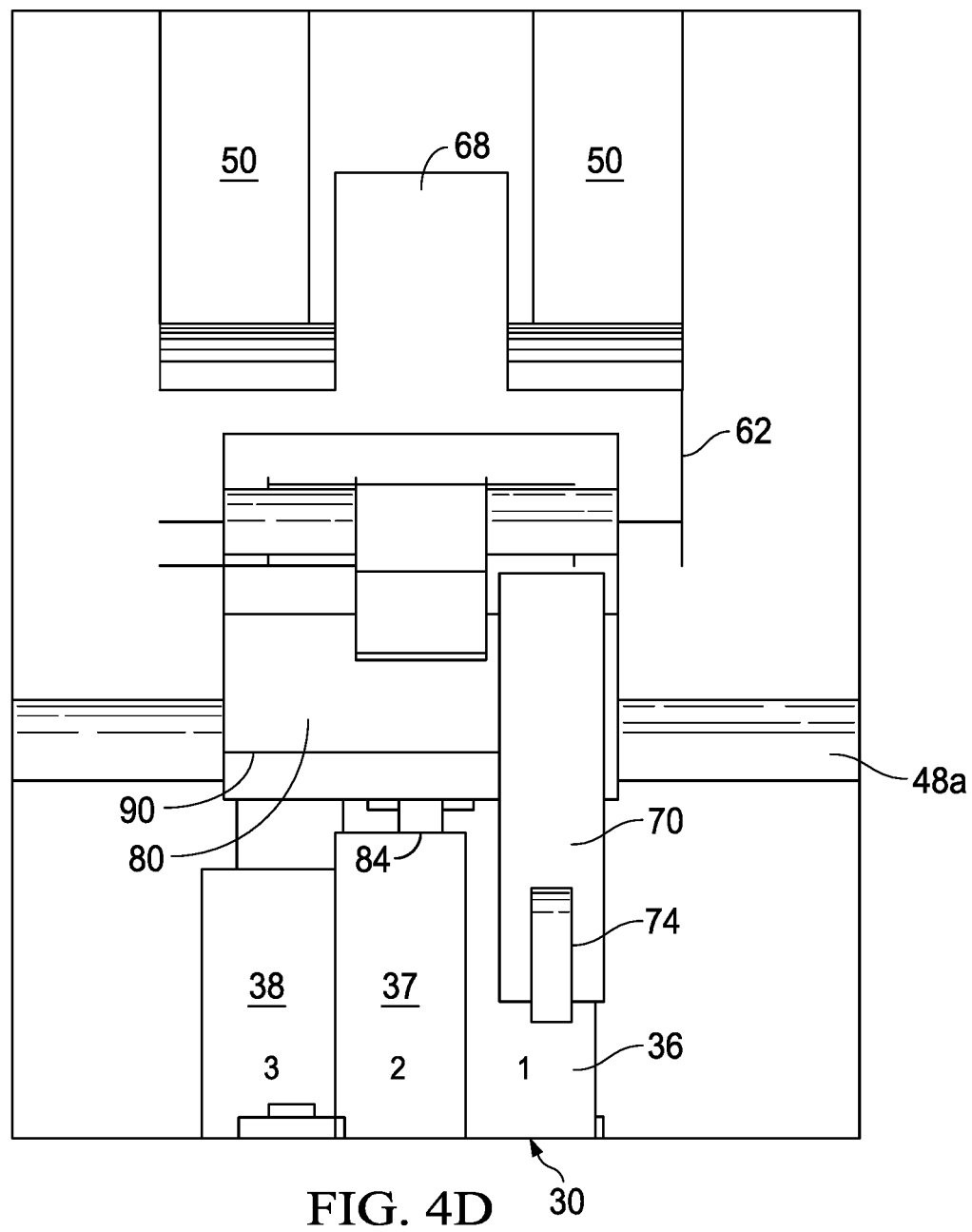
FIG. 4D is close-up cross-sectional view of a gear block assembly shown in FIG. 4A engaged with an output gear.

By varying the radius of each pathways or grooves 36, 37, 38 on the cam assembly 30, linkage assemblies 70, 80, 90 drive their respective gear block 62 through a two-dimensional circuit in response to rotation of the cam assembly 30. As shown in FIG. 4A, in general, the two-dimensional circuit 65 includes urging the gear block to engage the output gear element 50 and move or rotate the output gear element 50 a specified quantum distance prior to disengaging from the output gear element 50, and returning back the specified quantum distance to again reengage the output gear element 50 once again and repeat the process. It is understood that the two-dimensional circuit 65 depicted in the drawings is not to scale and is somewhat exaggerated to illustrate the general principal of the invention. For example, the distance A-B would typically be much smaller than depicted. The travel path or circuit 65 of each gear block 62 is controlled by adjusting the length and configuration of the various linkage assemblies and altering the pathways or grooves formed in the cam assembly 30.

When adapted to a gearbox mechanism 20, a plurality of gear block assemblies 60 are configured about the central axis 6 of the cam assembly 30. The cam assembly 30 is coupled with a power source 2 by means of output device 6. As the cam assembly 30 rotates, the cam follower elements (e.g., 74, 84, 94) of the respective linkage assemblies (e.g., 70, 80, 90) of each gear block assembly 60 maintain contact with a particular pathway or groove (e.g., 36, 37, 38) formed in the circumferential surface 34 of the cam assembly 30. The variance of distance from the center of rotation of the different pathways or grooves (e.g., 36, 37, 38) of the cam assembly 30 causes the linkage assemblies pivotally attached to its respective gear block 60 to work in concert to move their respective gear block through a predetermined circuit of movement 65. This predetermined circuit of movement 65 of the gear block 60 can be precisely calibrated to meet specific engineering requirements. For example, the torque ratio and speed reduction may be regulated and controlled by adjusting the circuit of movement 65 of each gear block assembly 60.

Figure 7A:
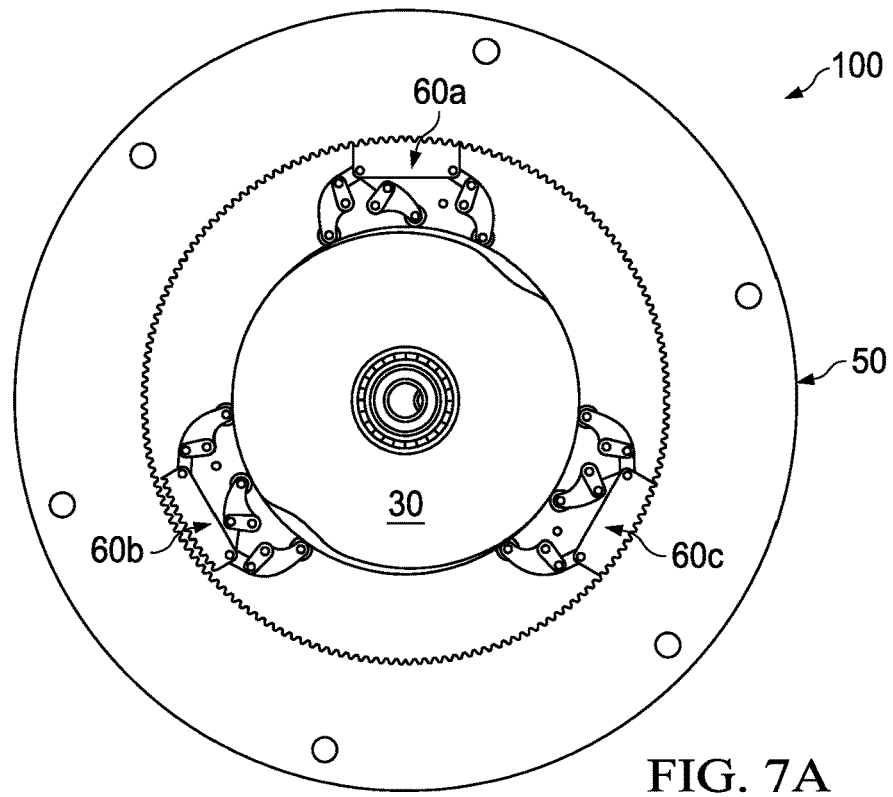
FIGS. 7A-7C are end views with the outer stationary plate removed of different variant embodiments of the gearbox mechanism of the present invention shown in FIG. 1.
Figure 7B:
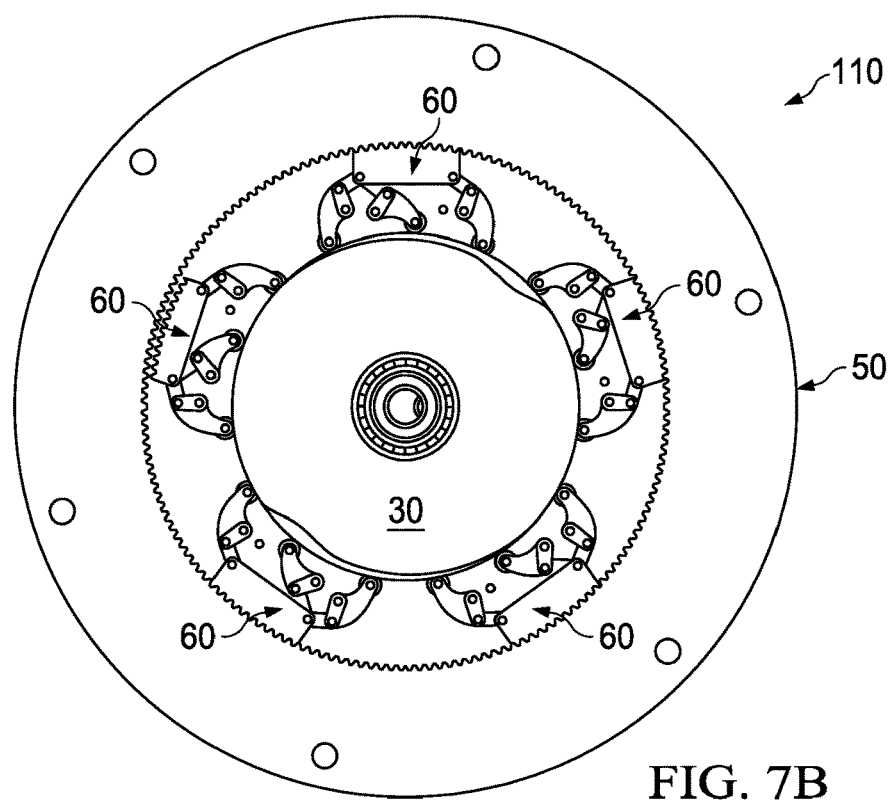

Numerous embodiments of gearbox mechanisms are possible using the gear block assembly 60 of the present invention. All embodiments of gearbox mechanisms constructed in accordance with the present invention feature a plurality of gear block assemblies 60 configured about the central axis 6 of the cam assembly 30 and may comprise either an odd or even number of gear block assemblies 60. At least two, and preferably three gear block assemblies are required for a gearbox mechanism of the present invention. For example, as shown in FIG. 7A, a variant embodiment of the gearbox mechanism 100 featuring three gear block assemblies 60 is depicted. FIG. 7B depicts a variant embodiment of the gearbox mechanism 110 featuring five gear block assemblies 60. The movement of the gear block assemblies 60 typically moves in a rotational series to one another.

Figure 3:
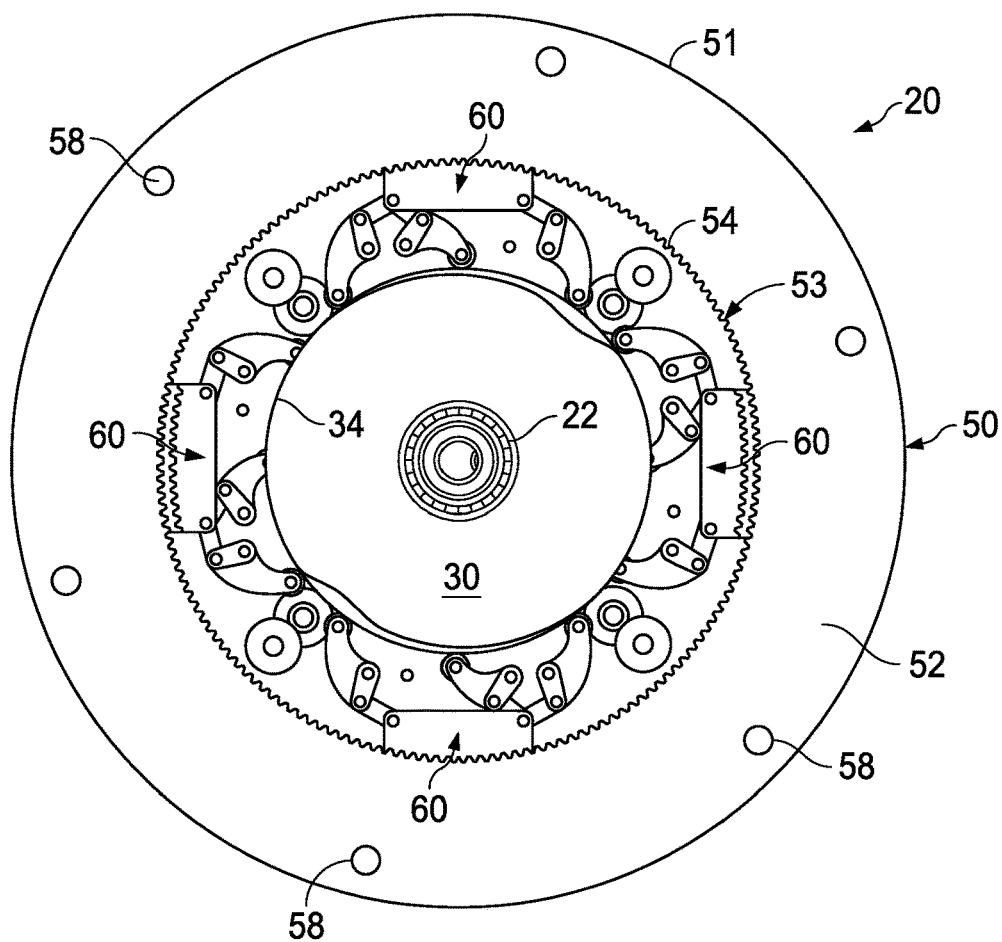
FIG. 3 is an end view thereof with the outer stationary plate removed.
Figure 7C:
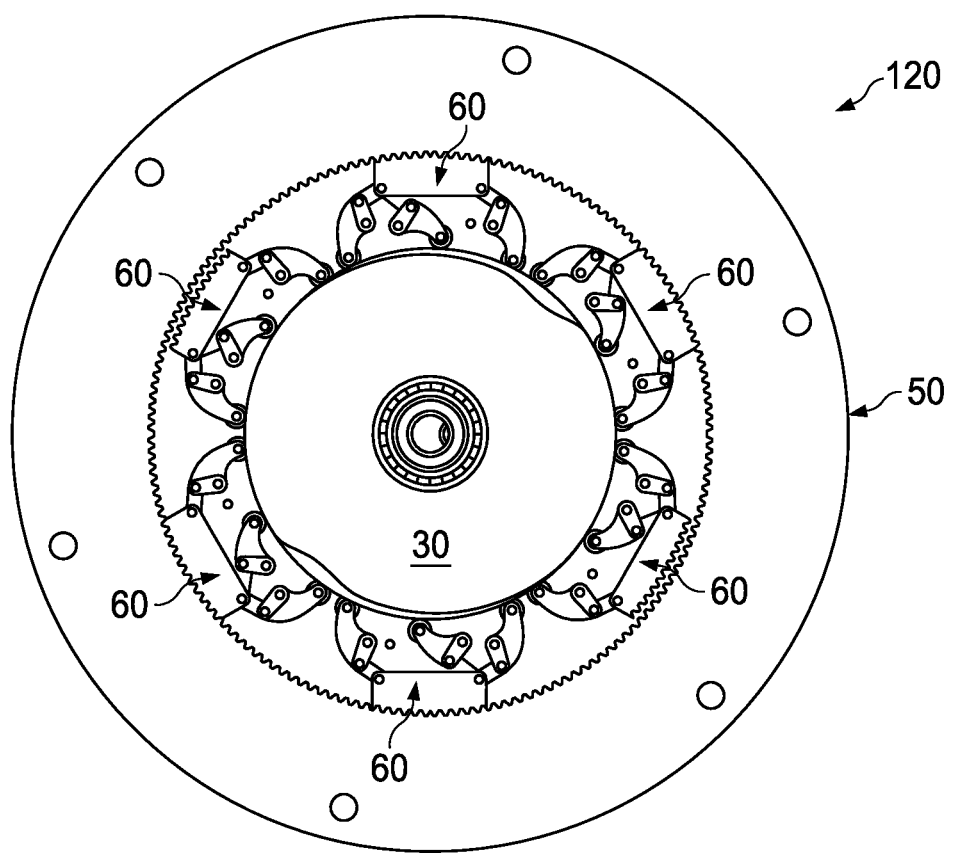

However, in a preferred embodiment of the present invention wherein the plurality of gear block assemblies comprises four or more even-number gear block assemblies 60, the gear block assemblies 60 configured on opposing sides of the cam assembly 30 engage and disengage in unison from the secondary or output gear element 50. For example as shown in FIG. 3, an embodiment of the gearbox mechanism 20 featuring four gear block assemblies 60 is depicted. Similarly, FIG. 7C depicts a variant embodiment of the gearbox mechanism 120 featuring six gear block assemblies 60. This is accomplished by ensuring that the individual pathways or grooves formed in the circumferential surface of the cam assembly are in phase with one another on opposing sides of the cam assembly circumference.

Figure 8:
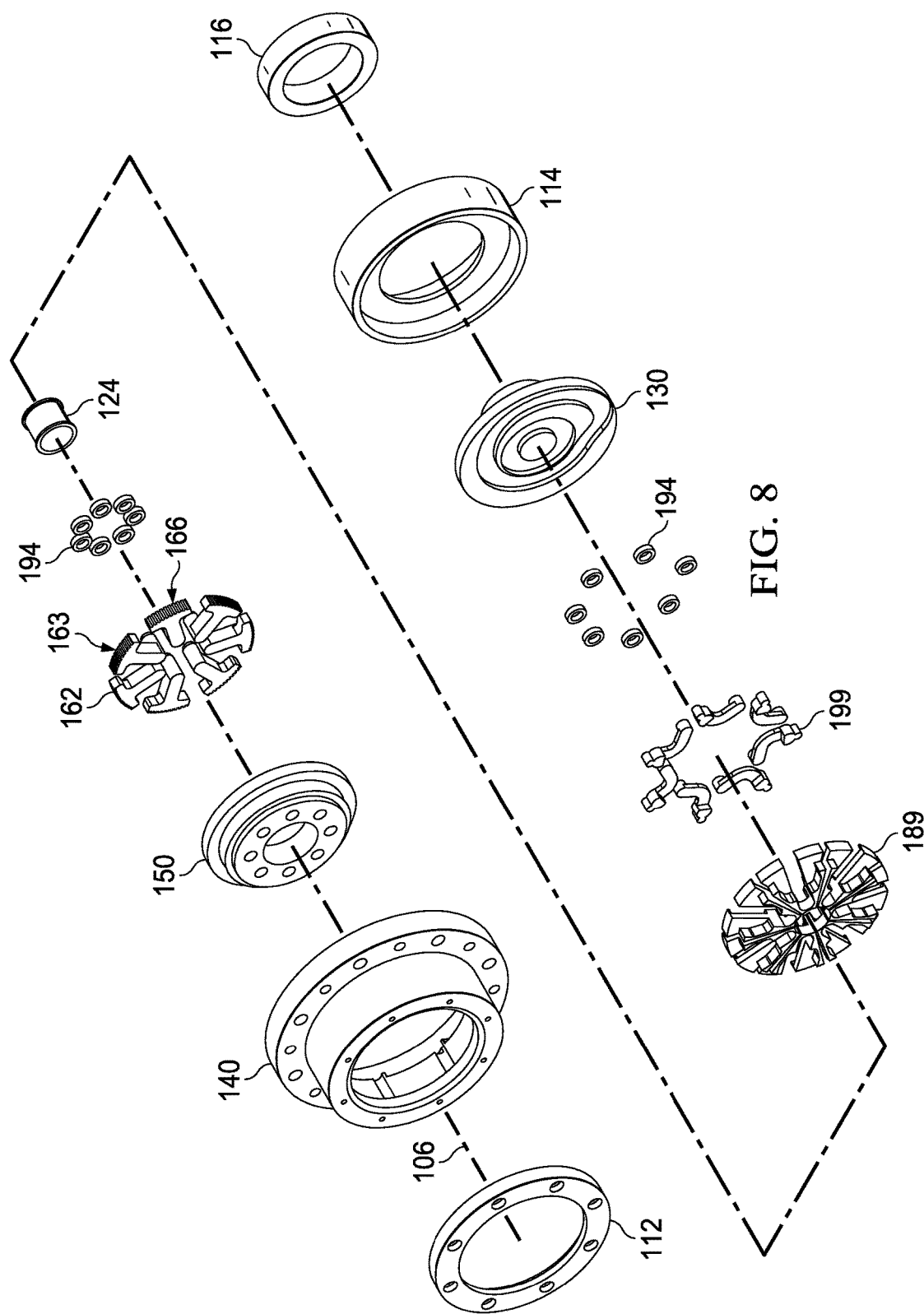
FIG. 8 is an exploded view of a second embodiment of a gearbox mechanism of the present invention.

With reference now to FIG. 8, a second embodiment of a gearbox mechanism 120 of the present invention is shown. The gearbox mechanism 120 can include a main body 140, an output element 150 and a plurality of simplified gear block assemblies 160. Additionally, the gearbox mechanism 120 may have a retainer 112 that interfaces with the main body 140 and the output element 150. This interface allows for the output element 150 to be connected to an output device and/or a rotatable device as part of the gearbox mechanism. The output device and/or the rotatable device can be an electric motor, an internal combustion engine, or any conventional power source, that can be adapted to generate or receive rotative power. Additionally, the output device and/or rotatable device may be rotatively coupled by means of gears, chains, belts, or magnetic fields. The output element 150 interfaces with the gear blocks 162 via an interfacing surface, where an output element 150 can have an internal interface surface or external interface surface. An internal or external interface surface can include gear teeth, friction based geometric engagement, friction wedges, or any other forms of mating surfaces, including but not limited to, pole and hole.

With reference now to FIGS. 8 and 9, the cam actuated gear block assembly 160 can include a gear block 162, a torque lever 199, cam follower(s) 194, and/or socket 189 (or a portion of a socket 189). The cam actuated gear block assemblies 160 are configured about a central axis 106. A shaft, gears, belts, or magnetic fields (not illustrated) may be utilized along the central axis 106 to couple an input device and/or rotating device with a cam element 130 to generate a force or rotative force on the cam element 130. The rotational force on the cam element 130 allows for a driving or rotative force on the cam actuated gear block assemblies 160. In a preferred embodiment, the main body 140 is stationary or is a stationary plate with respect to the cam actuated gear block assemblies 160 and/or the output element 150.

While the output element 150 is depicted as a single circular ring, it is understood that the output element or power gear element 150 may comprise two circular rings held apart by spacer elements (not illustrated). The output element 150 includes apertures or holes 158 defined along an outer surfaces and/or within the output element 150 for attaching to an output shaft or power takeoff (not illustrated). In addition, it is understood that the outer circumference 151 of the output element 150 may also comprise a surface to interface with some other gear train mechanism, or other output devices through belts, or gears.

The gear blocks 162 of the present invention are specifically designed to enable a greater surface area (e.g., greater number of gear teeth) to engage the output element 150 at any given time, thereby spreading the stresses associated therein across a greater area. By dramatically increasing the contact area between the gear block 162 and the output element 150 at any given time the mechanical stress level is significantly decreased. In addition, the gear block 162 assemblies of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 162 against the output element 150 are distributed across a greater area, the gear block 162 may be manufactured of lighter-weight materials, which are typically less expensive and easier to manufacture, with no degradation in reliability.

For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism 120 of the present invention is adaptable to a broad range of applications that were previously impractical because of weight and space limitations.

In at least one embodiment of the present disclosure, the gear blocks 162 may also rest inside or be surrounded by a socket 189. The socket 189 may also be associated or coupled with the torque lever 199. In some embodiments, the torque lever 199 can also have a set of cam followers 194 allowing for the following of a specified pathway(s) formed in or along a planer surface of the cam element 130. The cam element 130 can also have an input hub 114 or a ball bearing assembly 116 that allows the cam element 130 to rotate freely based upon an input device such as a shaft or rotatable elements such as a set of other gearing, belts, levers, magnetic or electrical fields, etc. The socket 189 can also have a central guide 124 that rests in the center that allows a shaft and/or rotatable element to be passed through of the output element, main body, retainer, gear blocks, torque levers, and/or cam element along a central axis 106. The gear blocks 162, cam followers 194, central guide 124, socket 189, torque levers 199, and cam element 130 can comprise a gear block assembly 160. The gear block assembly 160 allows for the gear block 162 to be rotated in a manner that engages with the output element 150 by an intersection of the cam followers 194, and cam element 130. The interface surfaces of the gear block 162 can engage with the output element interface surface (not illustrated) of the output element 150. In some embodiments, the gear blocks are rotated by the socket and an associated movement of the torque lever 199.

The cam element 130 includes at least one unique pathway or groove that interfaces with the cam follower 194 of gear block 162 or torque lever 199 so that as the cam element 130 rotates, the movement of the gear block 162 or torque lever 199 is controlled in two dimensions in accordance with at least one certain design parameter. By varying the radius of the pathway or grooves on the cam element 130, the cam actuated gear block assemblies 160 drive respective gear block(s) 162 through a two-dimensional circuit in response to rotation of the cam element 130. Broadly speaking, the two-dimensional circuit includes urging the gear block(s) 162 to engage the output element 150 and move and/or rotate the output element 150 a specified distance prior to disengaging from the output element 150, and returning back the specified distance to again reengage the output element 150 once again, and repeat the process. The travel path or circuit of each gear block 160 is controlled by adjusting the length, width, height, and/or size of the respective gear block and/or torque lever and/or altering the pathways or grooves formed in the cam element 130.

The torque lever is pivoted around a specific pivot point by the cam follower 199, which traverses the path in the cam element 130. Additionally, the socket and/or the gear blocks may also have a cam follower 199 that follows the same or a separate path along the cam element 130 that also triggers a pivot point for the socket or gear block(s). In at least one embodiment, there is at least one pivot point for both the gear block and the torque lever that allows each to pivot separately from each other and while also being in a moving conjunction to create a specific pattern of movement for the gear blocks. The movement of a gear block, in at least one example, is a cyclical, annular or closed loop movement that may have a generally rectangular, elliptical, circular, square, conical, oval, ovoid, truncated circular pattern, or any combination thereof, design specified pattern of movement.

Figure 9A:
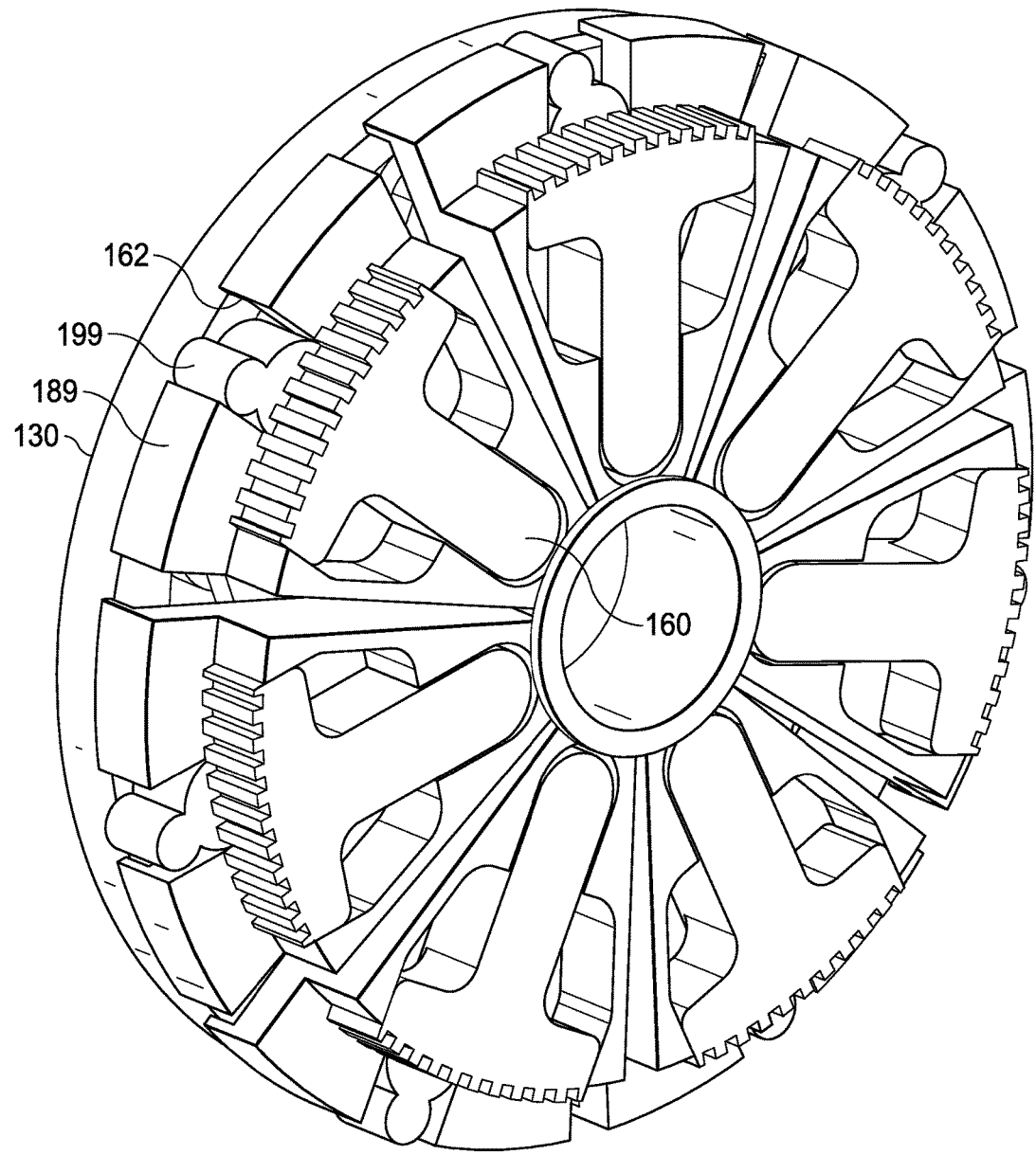
FIG. 9A is a perspective view of a cam element along with the torque lever, socket, and gear block of the gearbox mechanism shown in FIG. 8.

With reference now to FIG. 9A, a perspective view is depicted of the cam element 130 along with the torque lever 199, socket 189, and gear block 162. Central axis 106 can pass through the central guide 124 at the center of the socket 189, cam element 130, and/or output element 150. The socket 189 can include individual pieces that also correspond to each individual gear block 162. In at least one embodiment of the present disclosure, the socket 189 interacts with the toque lever 199 along with the gear block 162 to rotate and cause a movement of the gear block 162 to have a cyclical, annular or closed loop movement having a generally rectangular, elliptical, circular, square, conical, oval, ovoid, truncated circular pattern, or any combination thereof, design specified pattern of movement based upon the pathways in the cam element 150 that may allow a cam follower (not illustrated) attached to the torque lever 199 to traverse along the pathway to generate movement of the gear block(s).

The cam follower (not illustrated) can also be attached to a gear block and/or socket allowing a force to be generated against them as well. Each of the cam followers can have a separate path or, in some embodiments, may have a single path. The gear block(s) 162 can be pivotally connected to the torque lever 199, and/or the socket 199. Alternatively or in addition, a ring spring connecting all of the gear blocks 162 in a gear train may be used as a biasing mechanism in accordance with the present invention. In at least one embodiment of the present disclosure, the paths in the cam element 130 can be in the same plane where they are parallel paths, or paths of different distances from the central axis 106, or the paths can be in separate planes stacked in the direction of the central axis 106.

Figure 9B:
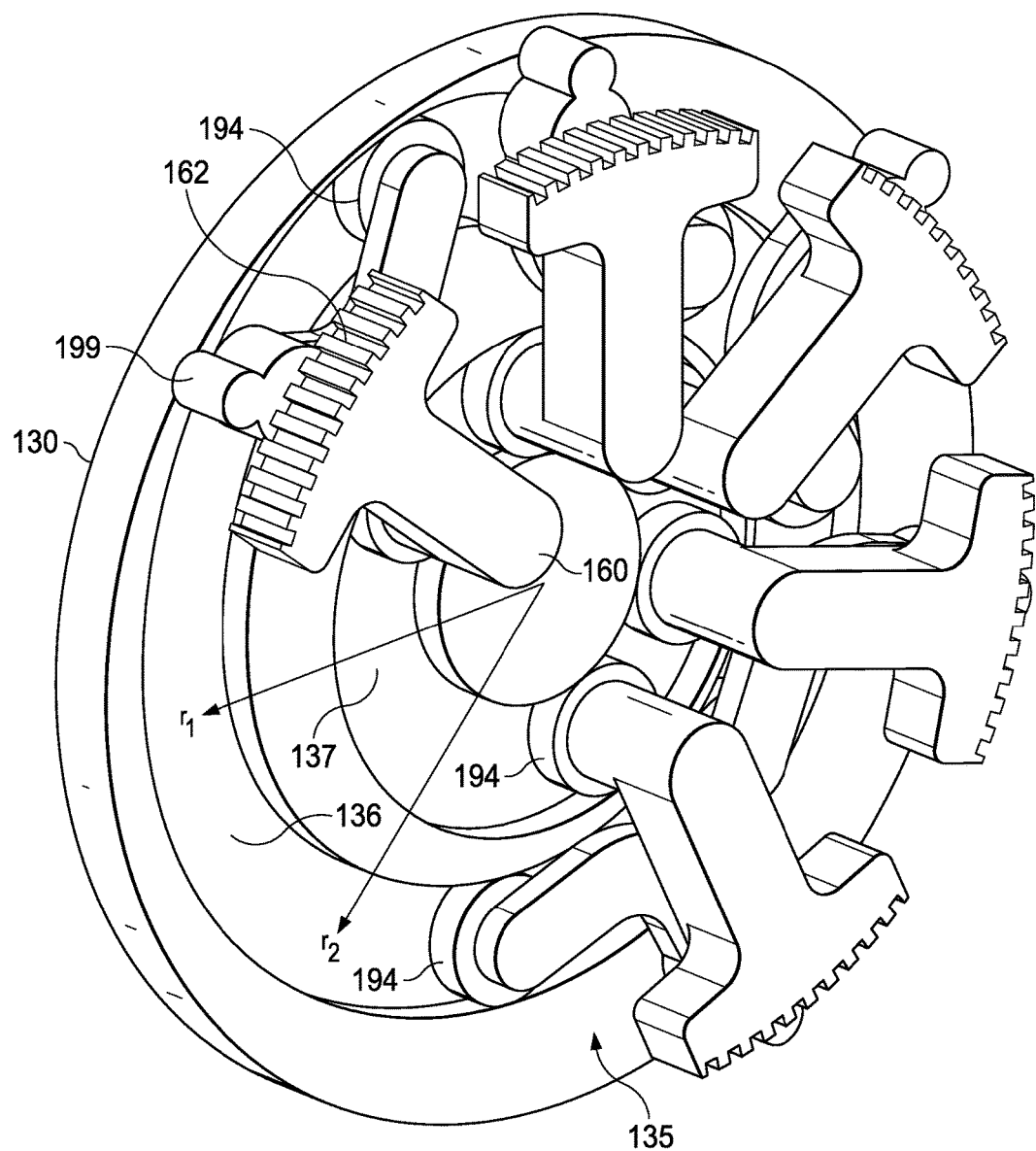
FIG. 9B is a partial-cutaway, perspective view of a cam element, torque lever, and cam followers of the gearbox mechanism shown in FIG. 8.

With reference now to FIG. 9B, a perspective view of the cam element 130, torque lever 199, cam followers 194 coupled to the torque lever 199 as well as the cam follower 194 coupled with the gear block 162. In at least one embodiment, the first pathway 136 along cam element 130 as well as a second pathway 137 along the cam element 130 allow for movement and rotation of the gear blocks allowing for the interface surfaces of the gear blocks 162 to engage, interface and/or interact with the output element (not illustrated). Cam follower(s) 194 maintain contact with the surface of their respective pathways or grooves formed in the cam element 130. The first pathway 136 has a first radius $r_1$ at one part of its plane that is greater than a second radius $r_2$ at another part of its plane. This creates a unique, undulating path for each pathway as the cam element 130 rotates. While the cam element 130 depicted in the Figures, appears to be a single disc or unit having a plurality of pathways or grooves formed in the planer surface 134 of the cam element 130, it is understood that the cam element 130 may also comprise a plurality of separate discs, each having a unique pathway formed in its circumferential surface, which are mechanically coupled to one another to assemble a single cam assembly 130.

As the cam element 130 rotates, the cam follower(s) 194 follow their respective pathways maintaining contact with the planar surface of the respective pathway or groove 136/137. As the radius of the pathway changes, the respective gear block 162, and/or torque lever 199 pivots or moves about its pivot point to compensate for the change in the pathway or groove. In at least one version, the torque lever 199 may pivot about its pivot point inducing a movement or pivoting of the socket (not illustrated) and/or a gear block 162 to which is it pivotally coupled to, and results in a movement of the gear block 162. Thus, as the cam element 130 rotates, the movement of the gear block 162 is controlled by the induced pivoting of the torque lever 199, and/or socket (not illustrated). For example, by varying the radius of the first pathway or groove 136 on the cam element 130, the torque lever 199 pivots about its pivot point to compensate and maintain contact between torque lever 199 and the socket (not illustrated). This pivoting or moving of the torque lever 199 about its pivot point induces movement in the pivotal connection with the socket (not illustrated) and/or gear block 162. Each torque lever 199 acts independently of the other torque lever(s) 199 due to the cam follower(s) 194 of each torque lever 199 following and/or traversing first pathway 136 formed in the planar surface of the cam element 130 at their respective distinct points.

With regards to the cam element 130, the first pathway 136 and the second pathway 137 can be in the same plane and at times be parallel and/or nonparallel with each other, wherein the first pathway is on an outer radius of the cam element 130. In the second pathway 137 along an inner radius and is closer to the central axis of the cam element 130. It is understood, that in some embodiments the pathways can be stacked in separate planes such that the first plane and second plane are stacked one on top of the other in a Z direction or central axis 106. As the cam followers for the gear block and the torque lever follow their respective pathways, the torque lever can pivot at specific point causing a socket and/or the gear block itself to rotate around a specific point. Cam follower(s) for the gear block also allow for the gear block to transition in certain present and/or predetermined directions. For example, the pivot point of the torque element will trigger a left, right, or a linear motion, or a latitudinal motion while the cam follower following the second pathway coupled to the gear block 162 can allow for a longitudinal movement of the gear block. Associated together they allow for a cyclical, annular or closed-loop movement of the gear block and the interfacing surface that has a generally rectangular, elliptical, circular, square, conical, oval, ovoid, truncated circular pattern, or any combination thereof, design specified pattern of movement.

Figure 10A:
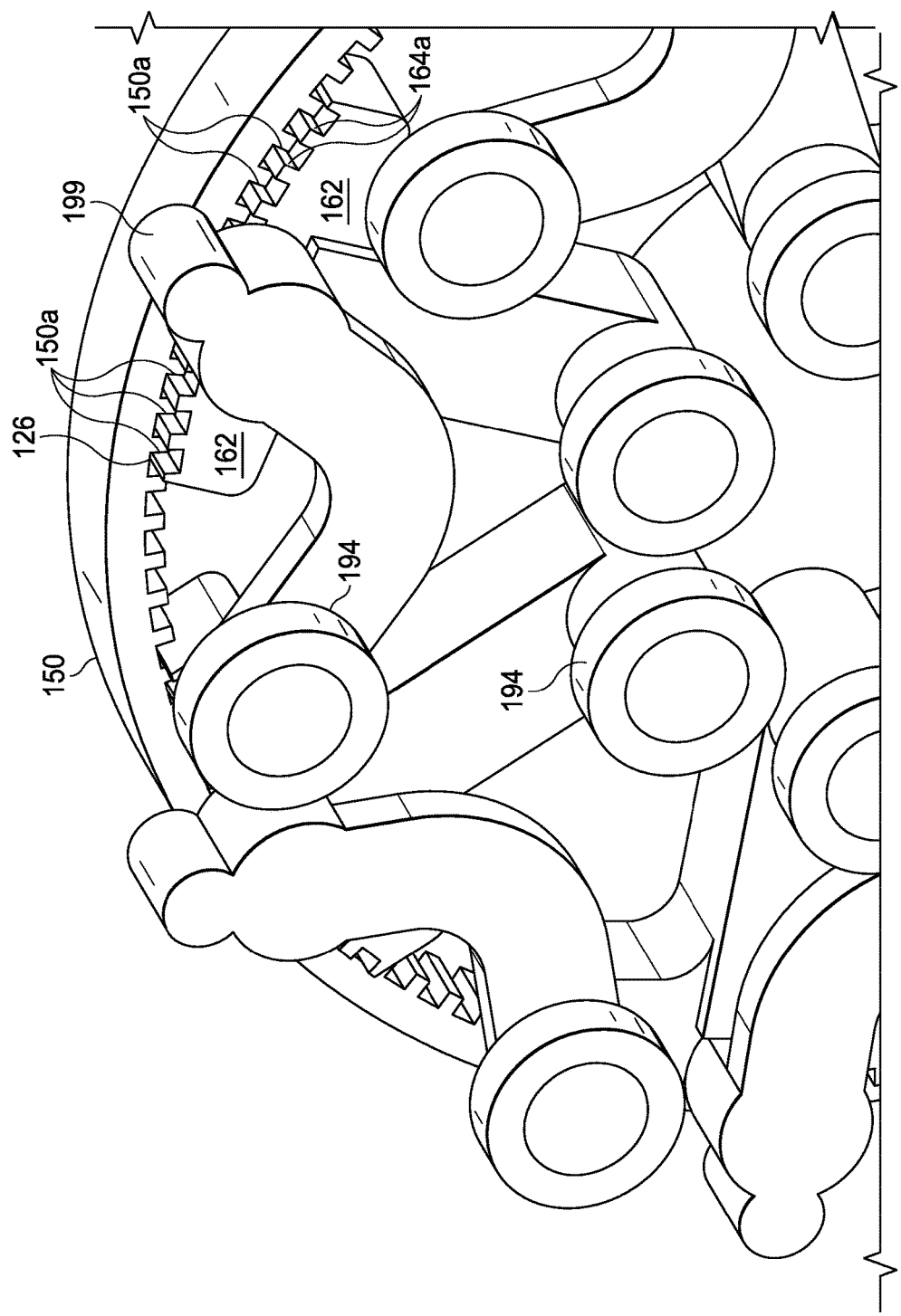
FIG. 10A is a close-up side view of a gear block and the output element of the gearbox mechanism shown in FIG. 8.
Figure 10B:
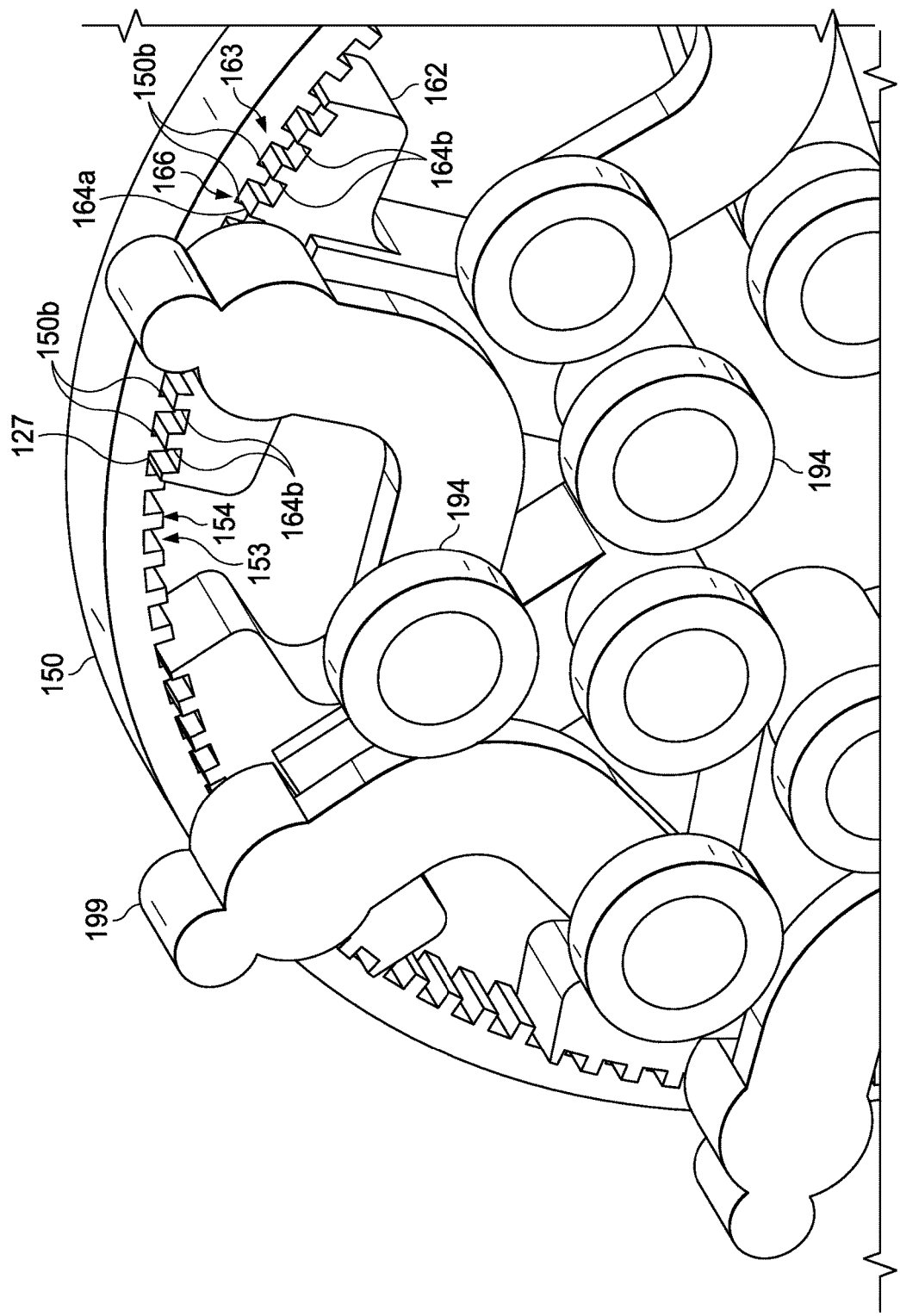
FIG. 10B is a close-up side view of a gear block and the output element of the gearbox mechanism shown in FIG. 8.

With reference now to FIG. 10A, an illustration of a gear block 162 interacting with the output element 150 is depicted illustrating the variable bias which may be programmed or designed into the interaction between the gear block 162 and the output element 150. The interaction of the gear block 162 with the output element 150 may be biased either positively (i.e., in the direction of rotation), negatively (i.e., in the opposite direction of rotation) or neutrally. While applicable to all interface surfaces, variable biasing is especially important when the interface surfaces are gear teeth. Gear block 162 is illustrated in FIG. 10A as having a positive bias so that the advancing face 164a of each interface element (e.g., gear tooth) is biased to positively engage a respective advancing face 150a of the interface element (e.g., gear tooth) of the output element 150 so as to transfer rotational movement from the gear block 162 to the output element 150. In FIG. 10B the gear block 162 is illustrated as having a negative bias so that the following face 164b of each interface element (e.g., gear tooth) is biased to engage a respective following face 150b of the interface element (e.g., gear tooth) of the output element 150. The negative bias induced by the gear block 162 can impart a slight tension on the output element 150 to reduce and/or eliminate backlash along the output element as the gear block 162 rotates the output element 150. For example, a gear block on one side of an output element can be in a positively biased configuration 126 while a gear block interfacing on the opposite side or offset from the positively biased gear block, can be in a negatively biased configuration 127.

A gear block may also be configured in a neutral or balanced configuration 125 (FIG. 10C) wherein the gear block interface element (e.g., gear tooth) is neither positively nor negatively biased towards the interface element or surface of the output element 150. For example, when the gear block 162 is moving from a positively biased configuration 126 (FIG. 10A) to a negatively biased configuration 127 (FIG. 10B), the gear block 162 can be in a balanced and/or neutral configuration which decreases the rotational tension or engagement of the gear block interface surface with the output element interface surface. Additionally, when the gear block transitions, repositions and/or returns from a negative bias configuration 127 to a positive bias configuration 126, or vice versa, the gear block 162 can be unloaded and/or disengaged from the output element interface surface so that the gear block 162 can smoothly disengage (i.e., pull and/or drop away) from the output element 150.

Gear blocks 162 can be arranged so that they extend outwardly, for example, the interface surface 163 (e.g., a plurality of projections or teeth 166), which correspond to a complementary interface surface 154 (e.g., projections or gear teeth) configured on an interface surface 153 of the output element 150, extending outwardly from a center guide or central axis 106 or, the interface surface 163 can extend inwardly towards a central axis 106. Gear blocks 162 can also include a set of cam followers 194 that may allow for a traversing of a pathway of the cam element 130. The cam follower(s) 194 can maintain contact with a pathway or groove formed in the planar surface of the cam element 130. It is understood that the interface between the gear block 162 and the output element interface surface 153 of the output element 150 of the present invention comprises not only the preferred gear teeth as depicted, but also any complementary arrangement such as pins and holes or even friction fit surfaces.

Figure 10C:
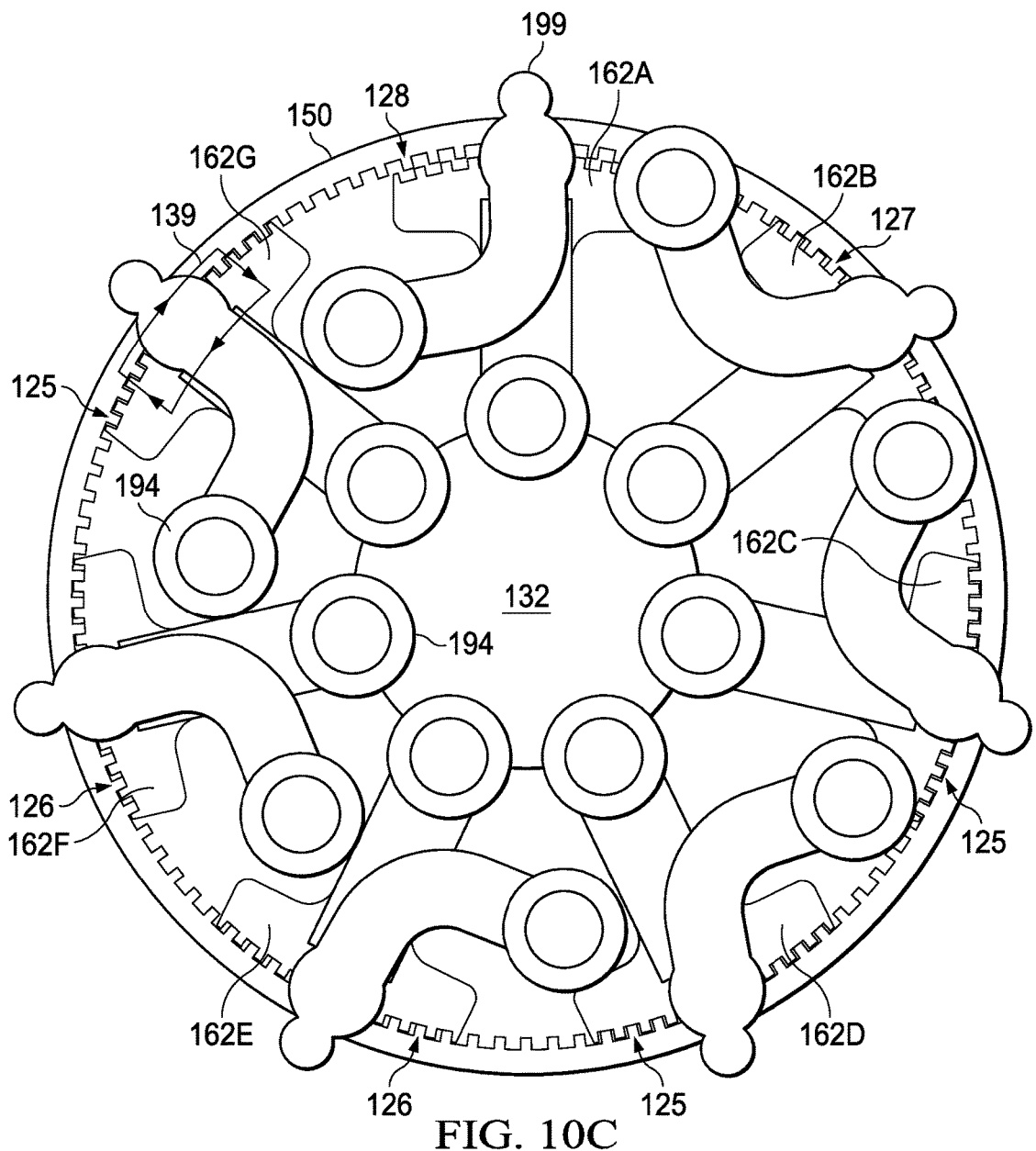
FIG. 10C is a side view of a gear block and the output element of the gearbox mechanism shown in FIG. 8.

With reference now to FIG. 10C, a side elevation view of the output element 150, gear blocks 162, torque levers 199 in the central aperture 132 is shown. A shaft and/or other rotatable device can be passed through the central aperture 132 attached to the output element and/or cam element (not illustrated). The cam followers 194 can be coupled to the gear blocks 162, as well as the torque levers 199. The cam followers 194 can follow specific paths for both the torque levers and the gear blocks generating forces to move them through their various positions going from a path along the outer path of the cam element or an inner path for the gear blocks.

The gear block(s) illustrated 162 are shown in various positions starting with the top most gear block 162A is shown in a transitioning/repositioning position 128 where it is fully disengaged from the interface surface of the output element 150 and the interface surface of the gear block 162A is fully disengaged. (Please note that the illustrated spacing of the gear block teeth is exaggerated to better illustrate the different bias configurations at issue). Moving to gear block 162B is shown in a reversed tension or negative bias configuration 127. There can also be a position such as one that gear block 162C and/or 162D when they are in a neutral bias configuration. Gear block 162E is illustrated in a positively biased or engaged configuration 126, which can result in a rotation of the output element 150. Gear block 162F is illustrated also in a positively biased or engaged configuration 126. Gear block 162G is also illustrated as one in a neutral bias configuration. There can be three engagement positions for a gear block to be in: an engaged or positive bias position 126, a reversed tension or negative bias position 127, and/or a neutral bias or balanced position 125. Additionally, a gear block can be in a transitioning/repositioning position 128, which allows for the gear block 162 to disengage and/or move away from the output element 150 to return to one of the engagement positions.

Moreover, it should be understood that the, annular or closed loop cyclical movement of each gear block and cam element may be specifically programmed or designed to vary the bias configurations during a single cycle to enhance the effectiveness of the gear block assembly. Additionally, the amount or strength of bias, whether positive, negative, or balanced can be calibrated and varied throughout the cycle. For example, in one embodiment, when a gear block first engages the interface surface of the output element, the gear block is designed to engage with a neutral bias to maximize the efficiency of the engagement process, then quickly transition to a positive bias to maximize power transfer, then slightly before disengagement a return to a neutral bias to assist with an efficient disengagement prior to the transitioning/repositioning. The negative bias configuration could be programmed into the cycle to minimize backlash.

As the cam followers coupled to the gear block follow the first or second pathway of the cam element, they enable the gear block to move in a radial direction or what can be referred to as an up or down motion. An associated pivoting of the torque lever allows for the rotation or angular movement of the gear block in what can be referred to as a left or right movement. These movements can be corresponded or calculated together to generate a cyclical, annular or closed loop path for the gear block that may have a generally rectangular, elliptical, circular, square, conical, oval, ovoid, truncated circular pattern, or any combination thereof, design specified pattern of movement. In at least one embodiment of the present disclosure, torque lever and/or gear block are coupled together in a way that allows for a pivot point of the gear block and torque lever as caused by the traversing of the path by the cam followers to create the movement of the gear block. In at least one example, the angular movement of the gear block places a torque upon the output element 150.

With reference to FIGS. 9A, 9B, 10A, 10B, and 10C, by varying the radius of each pathway or groove 136, 137 on the cam element 130, torque lever(s) 199 drive their respective gear block(s) 162 through a two-dimensional circuit in response to rotation of the cam element 130. In general, the two-dimensional circuit 139 includes urging the gear block 162 to engage the output element 150 and move or rotate the output element 150 a specified distance prior to disengaging from the output element 150, and returning back the same specified distance to again reengage the output element 150 once again and repeat the process. It is understood that the two-dimensional circuit 139 depicted in the drawings is not to scale and is somewhat exaggerated to illustrate the general principal of the invention. For example, the distance A-B would typically be much smaller than depicted. The travel path or circuit 139 of each gear block 162 is controlled by adjusting the size and configuration of the torque lever(s) 199, socket 189, gear block(s) 162, and/or altering the pathways or grooves 136, 137 formed in the cam element 130.

When adapted to a gearbox mechanism 120, a plurality of gear block assemblies 160 are configured about the central axis 106 of the cam element 130. The cam element 130, in at least one version, may be coupled to a power source (not illustrated) by an output device (not illustrated). As the cam element 130 rotates, the cam follower(s) 194 of the respective torque lever(s) 199 and/or gear block(s) 162 of each gear block assembly 160 maintain contact with a particular pathway or groove 136, 137 formed in the planar surface 135 of the cam element 130. The variance of distance from the center of rotation of the different pathways or grooves 136, 137 of the cam element 130 causes the torque lever(s) 199, and/or socket 189 pivotally attached to a gear block(s) 162 to work in concert to move their respective gear block(s) 162 through a predetermined circuit of movement 139. This predetermined circuit of movement 139 of the gear block 160 can be precisely calibrated to meet specific engineering requirements. For example, the torque ratio and speed reduction may be regulated and controlled by adjusting the circuit of movement 139 of each gear block assembly 160.

Numerous embodiments of gearbox mechanisms are possible using the gear block assembly 160 of the present invention. All embodiments of gearbox mechanisms constructed in accordance with the present invention feature a plurality of gear block assemblies 160 configured about the central axis 106 of the cam element 130 and may comprise either an odd or even number of gear block assemblies 160. At least two, and preferably three or more, gear block assemblies are required for a gearbox mechanism of the present invention. The movement of the gear block assemblies 160 typically moves in a rotational series to one another.

However, in a preferred embodiment of the present invention wherein the plurality of gear block assemblies comprises four or more even-number gear block assemblies 160, the gear block assemblies 160 configured on opposing sides of the cam element 130 engage and disengage in unison from the secondary or output element 150. For example, an embodiment of the gearbox mechanism 120 may feature four gear block assemblies 160. Similarly, another embodiment of the gearbox mechanism 120 may feature six gear block assemblies 160. This is accomplished by ensuring that the individual pathways or grooves formed in the planar surface of the cam element are in phase with one another along the planer surface of the cam element.

Figure 11:
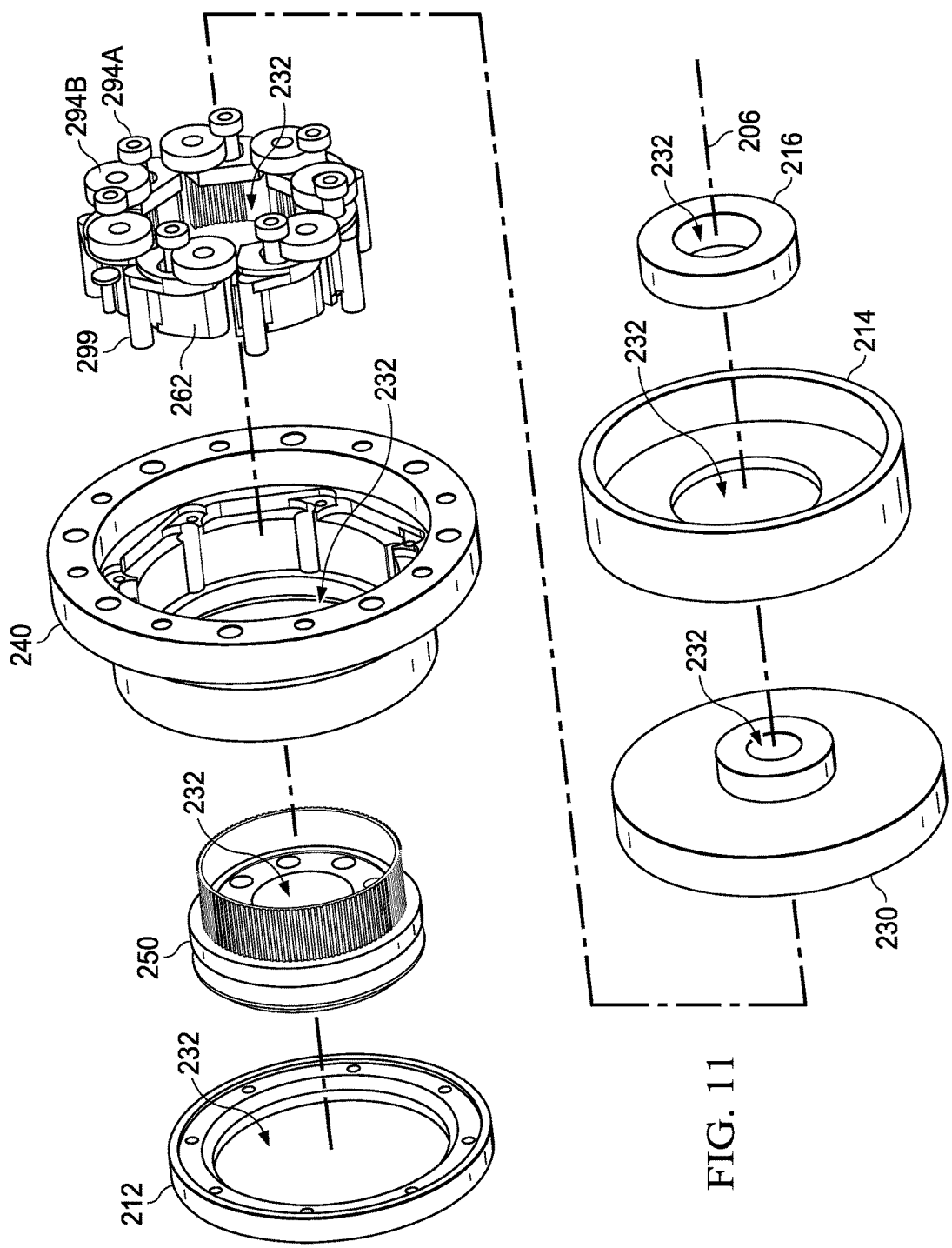
FIG. 11 is an exploded view of a third embodiment of a gearbox mechanism of the present invention.

With reference now to FIG. 11, an illustration of a third embodiment of a gearbox mechanism 220 of the present invention is depicted. The gearbox mechanism 220, in at least one version, can include a cam element 230, a main body 240, and output element 250, and a plurality of simplified gear block assemblies 260. In at least one example, the output element 250 is retained within the main body 240 by a retainer 212 (or retainer ring) via fasteners and/or couplers. The gear block assemblies 260 can be placed within the main body 240, and interfacing with the output element 250 and cam element 230. In some examples, the cam element 230 interfaces with an input hub and/or ball bearing assembly 216 (can also include a set of ball bearings, roller bearings, or ball bearing ring) through a friction or geometrical fit. A central axis 206 can traverse the retainer 212, output element 250, the main body 240, the gear block assemblies 260, the cam element 230, the input hub 214, and/or the ball bearing assembly 216.

The simplified gear block assemblies 260 can include a torque lever 299, a gear block 262, a first cam follower 294A, and a second cam follower 294B. The cam followers 294A/294B follow pathways (not illustrated) in the cam element 230 to generate forces on the torque lever 299, and/or the gear block(s) 262 generating a pivoting motion for both the torque lever 299 and the gear block(s) 262. In at least one version, the pivoting motion can be generally square pivot path for the gear block(s) 262. While in other versions, the pivot path of the gear block(s) 262 will generally be oval or circular.

The gearbox mechanism 220 can be coupled to an input or rotating device (not illustrated) such as an electric motor, internal combustion engine, or any conventional power source that can be adapted to generate rotative power. The input or rotating device (not illustrated) may be rotatively coupled through means of gears, chains, belts, or magnetic fields. An output device (not illustrated) may be coupled to the output element 250.

In at least one version, a central aperture 232 that has a central axis 206 traversing through it may be a part of the gearbox mechanism 220. The gearbox mechanism 220 is configured about the central axis 206 and can include a main body 240 that is stationary with respect to the cam element 230, output element 250, and/or cam-actuated gear block assemblies 260. In at least one example, spacer element(s) (not illustrated) may also be used to ensure that movement of the output element 250, cam element 230, and/or cam-actuated gear block assemblies 260 are not impeded by the main body 240 and/or retainer(s) 212, 214. The cam-actuated gear block assemblies 260 can be evenly spaced about the circumference of the output element 250. Each gear block assembly 260 includes a gear block 262, a torque lever 299, and at least one cam follower 294, which connect the gear block 262 to the planer surface of the cam element 230. The torque lever 299, and/or gear block 262 can interact to be pivotally attached, and correspond to the interaction and/or engagement of the cam follower(s) 294 with the cam element 230.

Figure 12A:
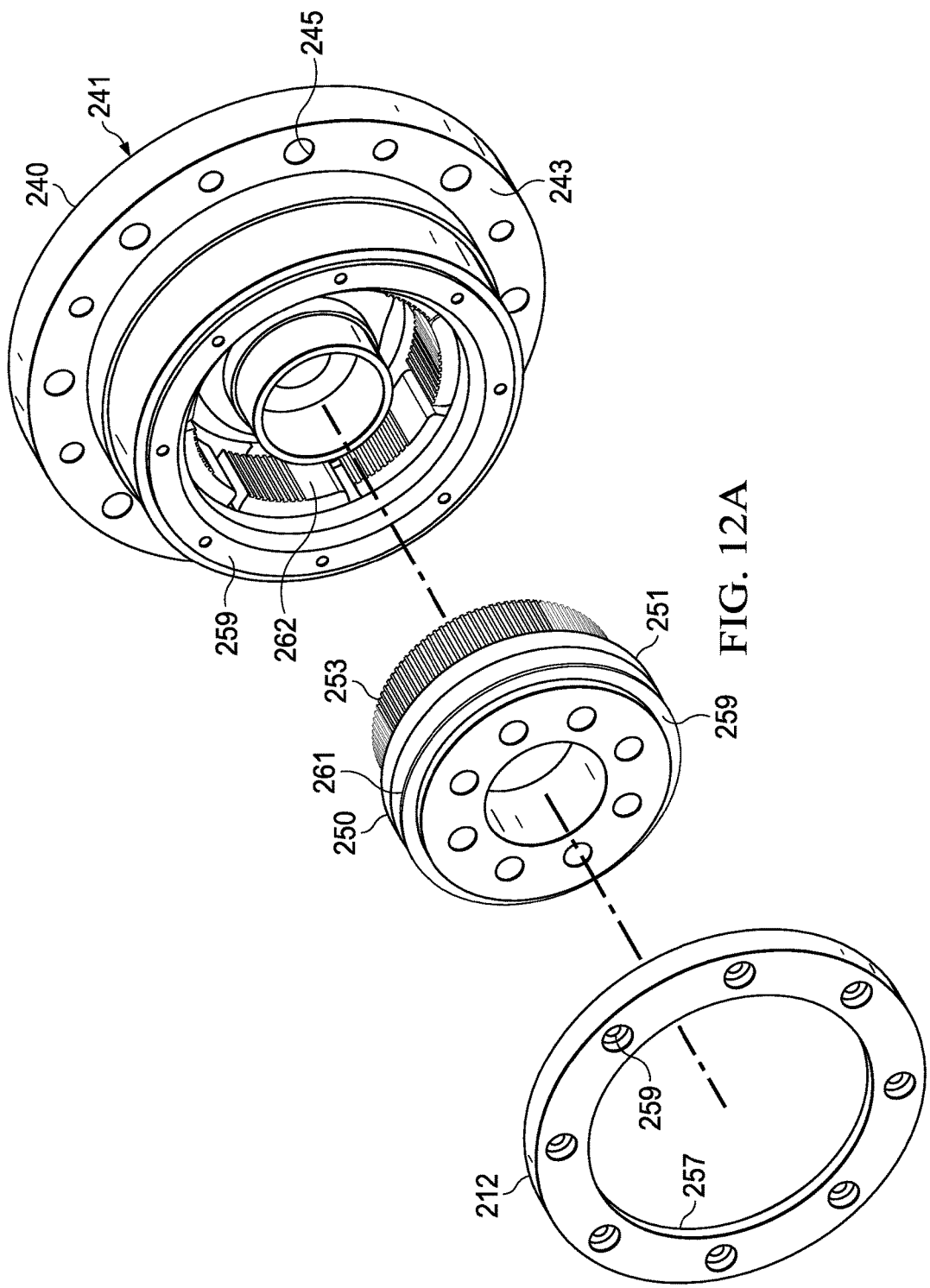
FIG. 12A is an exploded view of a main body, output element and retainer of the gearbox mechanism shown in FIG. 11.

With reference now to FIG. 12A, an exploded view of the main body 240, output element 250, and retainer 212 is shown. In a preferred embodiment, the main body 240 serves as a housing for the gear block assemblies (not illustrated), and the cam element (not illustrated). The main body 240 can be coupled on the cam side 241 to an input hub, rotating device, a retainer, a plate, or other protective or securing devices via a fastener or coupling aperture 245. On the output side 243, the main body 240 can be coupled to a retainer 212 via retainer fastener or coupling aperture 245.

The retainer 212 can also interface with the output element 250 and/or the output element outer circumferential surface 251, through a retainer inner circumferential surface 257. In at least one version, the output element 250 can have an output element lip 259 that may support and/or engage, the retainer 212 and/or retainer inner circumferential surface 257. A portion of the retainer 212 can interface with the output element 250, while the remaining amount of the retainer can interface with the main body 240. A fastener (not illustrated) can couple, fasten, and/or pass through a retainer fastener aperture 259 for fastening and/or coupling of the retainer 212 and the main body 240.

The output element 250, in at least one version, can include a roller track 261 (or ball bearing track) to allow and/or assist the output element 250 in rotation. The rotation of the output element 250 can result with the gear block(s) 262 engage with the output element interface surface 253. In at least one example, the rotation of the output element 250 may also be controlled through a reverse or tension engagement (i.e., negative bias configuration) of gear block(s) 262 that are not in a driving or positive bias rotational engagement in order to reduce and/or eliminate backlash.

Figure 12B:
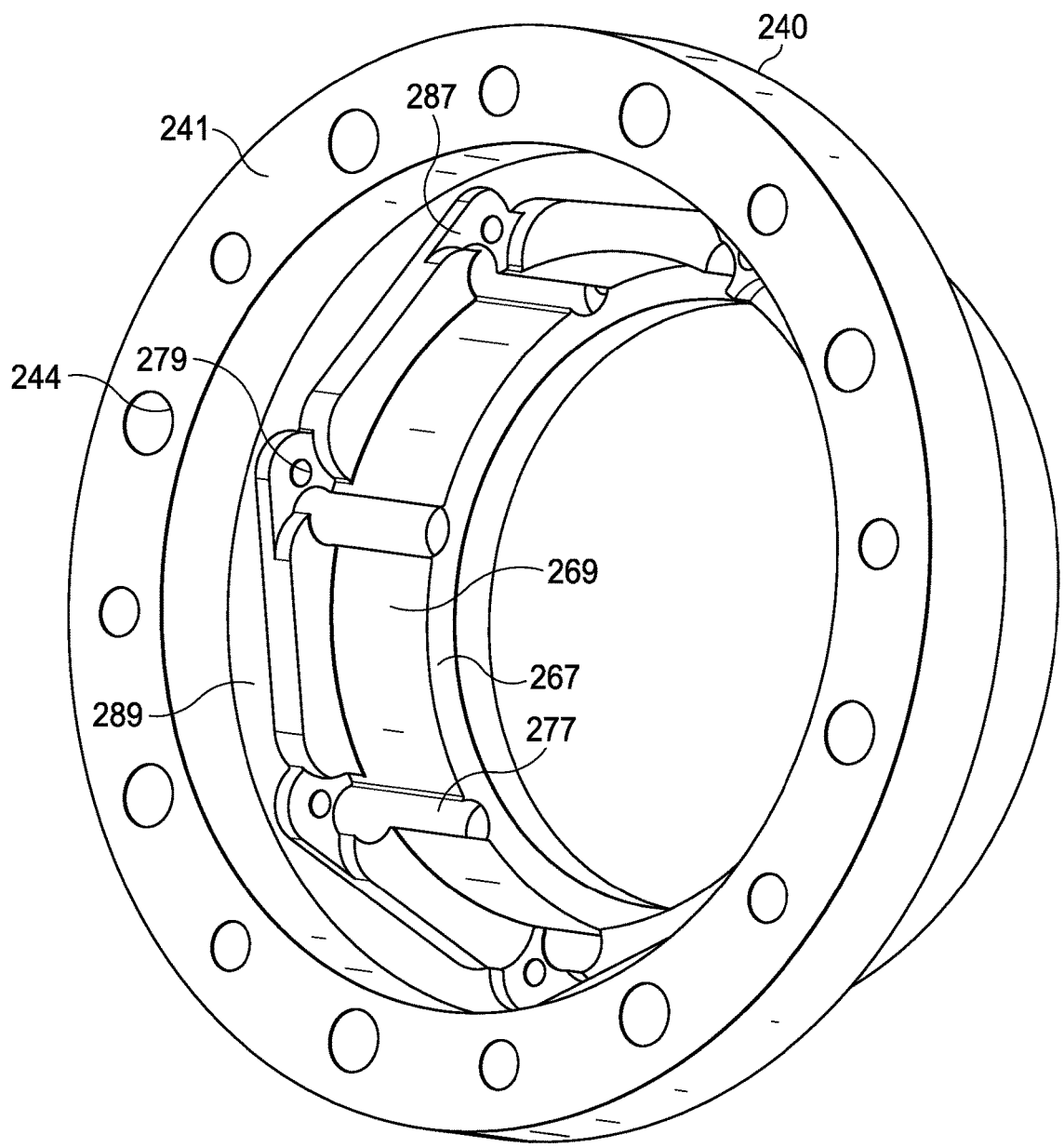
FIG. 12B is a perspective view of a main body of the gearbox mechanism shown in FIG. 11.

With reference now to FIG. 12B, a perspective view of a main body 240 is shown. The main body 240, in at least one version, can provide a housing for the gear assemblies (not illustrated). The gear block assemblies (not illustrated) can rest and/or be supported by the main body retaining surface 267. The gear block(s) (not illustrated) may also be retained and/or supported by the main body gear block interface surface 269. The torque lever(s) (not illustrated) may be supported and/or retained by the main body torque lever interface surface, and/or the main body torque lever void 277 as defined by the main body 240. A torque lever post (not illustrated) can be configured to be retained and/or supported by the main body torque lever void 277 to allow for a pivoting motion of the torque lever (not illustrated) to occur. The pivoting motion of the torque lever (not illustrated) can also coincide with a pivoting motion of the gear block (not illustrated) that allows for the interfacing, engaging, and/or rotating of an output element (not illustrated).

In at least one version, the main body 240 can also have a spacer (not illustrated) for the gear assemblies that can be secured to the main body 240 through a spacer aperture 279 defined by the main body 240. The spacer aperture 279 may be surrounded by the main body spacer interface surface 287. A cam interface surface 289 can support a cam element (not illustrated) as it engages with the gear assemblies (not illustrated), a rotatable or rotating device, and/or an input device. The main body 240 can be coupled on the cam side 241 to an input hub, rotating device, a retainer, a plate, or other protective or securing devices via a fastener or coupling aperture 244. The input hub, rotating device, a retainer, a plate, or other protective or securing devices, in at least one example, can be utilized to secure and/or support a cam element (not illustrated).

Figure 12C:
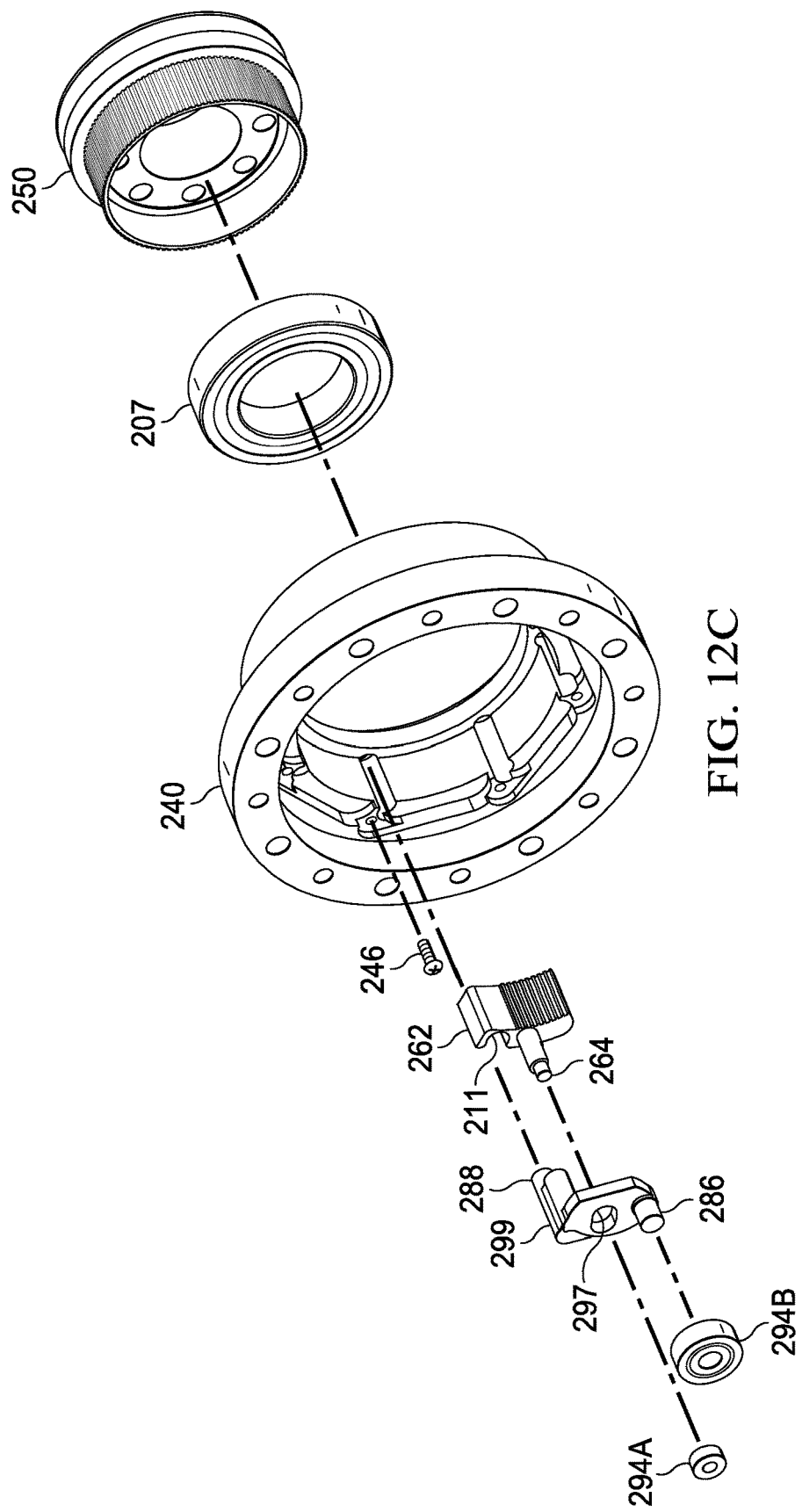
FIG. 12C is an exploded perspective view of a main body, and gear block assemblies of the gearbox mechanism shown in FIG. 11.

With reference now to FIG. 12C, an exploded perspective view of a main body 240, and gear block assemblies 260. The output element 250 may rest and/or be supported by the main body 240, and have a ball bearing assembly 207 (could also include a set of ball bearings, roller bearings, or ball bearing ring) that can be coaxial with the guide of a cam element (not illustrated) to allow the cam element freedom of movement. The gear block 262 can have a gear block post 264 that may interact with a torque lever aperture 297 to provide a pivot point for the gear block 262 and/or torque lever 299. The torque lever 299 may also have a torque lever post 288 that interacts and/or engages with a main body torque lever void 277 and/or a gear block opening 211 to provide a pivot point for the torque lever 299 and/or gear block 262. A cam follower 294 can also be rotatively coupled to the gear block post 264, and a cam follower 294B can be rotatively coupled to a cam follower post 286 of the torque lever 299. The torque lever 299, the gear block 262, and cam follower(s) 294A, 294B can be in at least one version, a cam actuated gear block assembly 260. In at least one example, a spacer 246 may also be added to provide support and/or secure the torque lever 299 and/or gear block 262.

Figure 13:
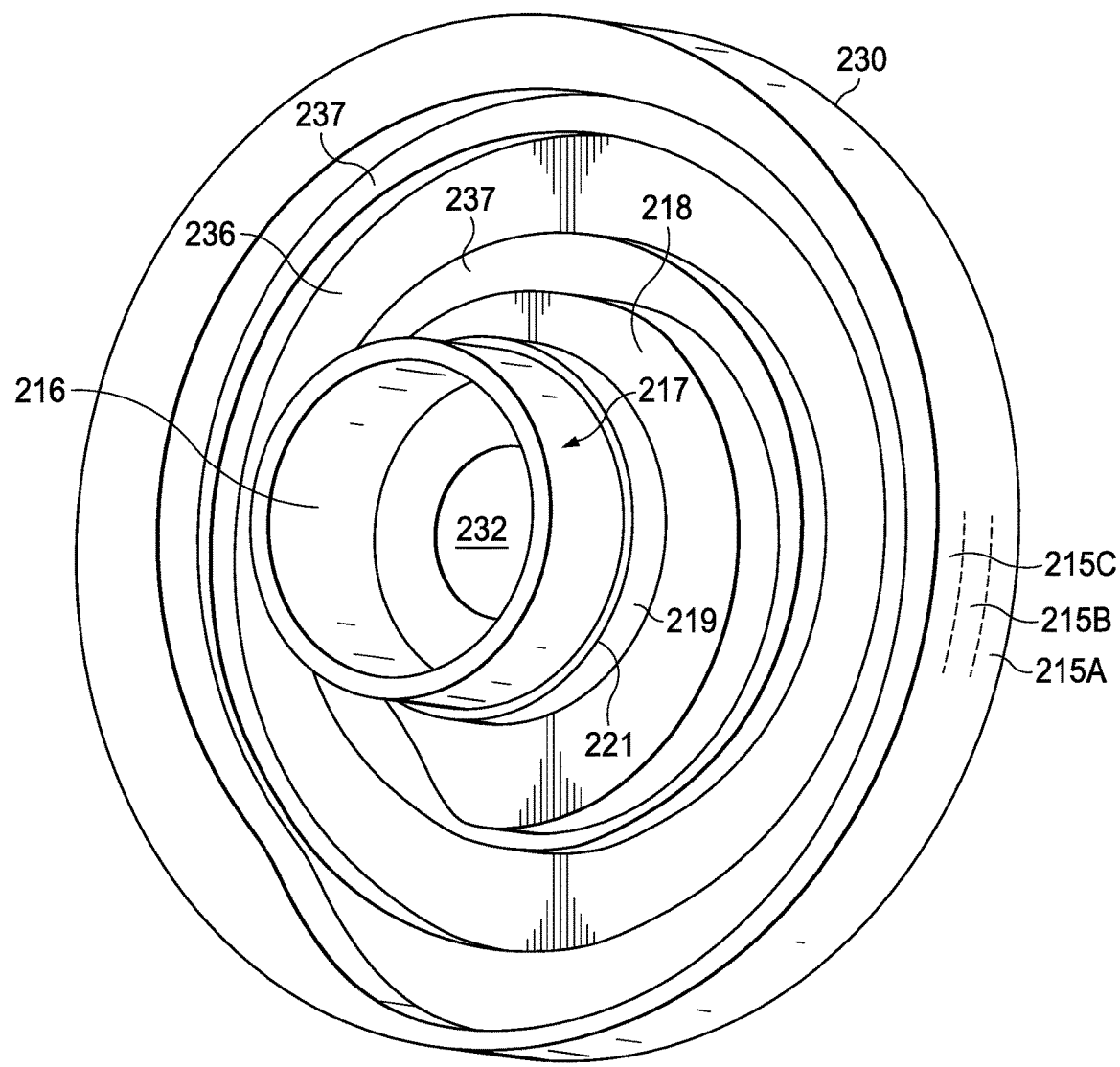
FIG. 13 is a perspective view of a cam element of the gearbox mechanism shown in FIG. 11.

With reference now to FIG. 13, a perspective view of a cam element 230 is depicted. The cam element 230 can have at least one plane 215A along the central axis 206. In at least one version, the cam element 230 can have two planes 215A/215B. While in other versions, the cam element 230 may have three planes 215A/215B/215C. The cam element 230 can have a cam element guide 216 that allows for an interaction of the cam element 230 with an output element guide and/or ball bearing assembly (or set of ball bearings) (not illustrated). The cam element guide 216 can be coaxial with the output element guide and/or ball bearing assembly (or set of ball bearings) (not illustrated) allowing for a centering along the central axis 206 via the cam element central aperture 232. The output element guide and/or ball bearing assembly (or set of ball bearings) (not illustrated) can interface with a cam element guide circumferential surface 217 along the outside of the cam element guide 216.

In at least one example, the first plane 215A may correspond and/or include a first pathway 236. The first pathway 236 can allow for the transversal of a cam follower (not illustrated) to generate a pivot or pivoting force on a torque lever and/or gear block (not illustrated). As the cam follower (not illustrated) traverses the first pathway 236 the pathway can change in direction to move a torque lever and/or gear block (not illustrated) coupled to the cam follower. Similarly, the second plane 215B may correspond and/or include a second pathway 237. The second pathway 237 can allow for the transversal of a cam follower (not illustrated) to generate a pivot or pivoting force on a torque lever and/or gear block (not illustrated). As the cam follower (not illustrated) traverses the second pathway 237, the pathway can change in direction to move a torque lever and/or gear block (not illustrated) coupled to the cam follower.

The gear block assemblies (not illustrated) can rest and/or be supported by a cam element support surface 218. A vertical or depth surface 219 of the cam element support surface 218 may also, in at least one example, provide a surface for the gear block assemblies to interface with and/or engage with. A cam element spacer 221 may also be included and/or coupled to the cam element guide 216. The cam element spacer 221 may, in some examples, be in a third plane 215C of the cam element 230.

Figure 14:
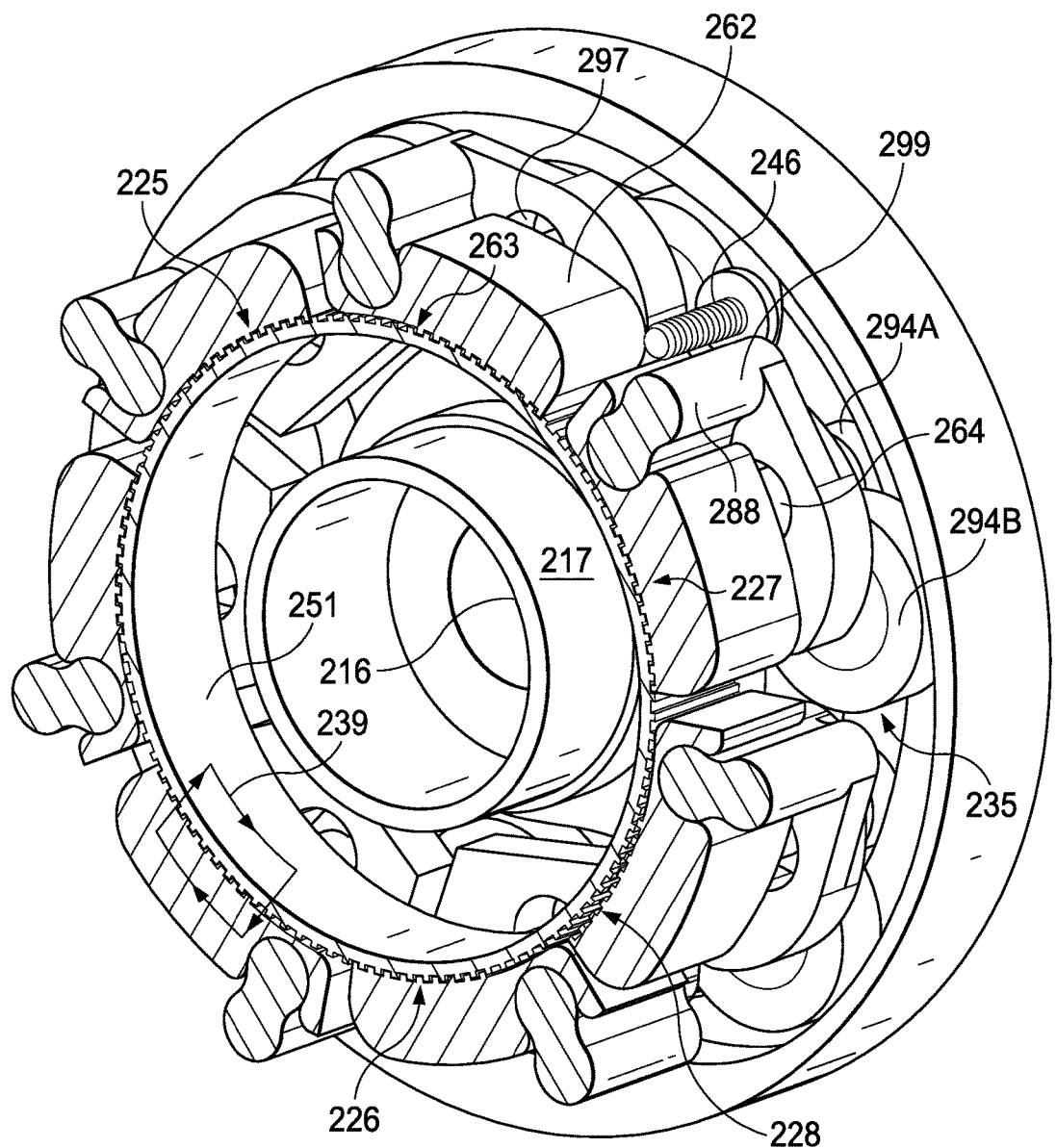
FIG. 14 is a perspective view of the gear block assemblies of the gearbox mechanism shown in FIG. 11.

With reference now to FIG. 14, a perspective view of gear block assemblies 260 interfacing with an output element 250. The gear block assemblies 260 can include a gear block 262, a torque lever 299, a first cam follower 294A, and/or a second cam follower 294B. In at least one version the first cam follower 294A is coupled to the gear block 262, and the second cam follower 294B is coupled to the torque lever 299. As the cam followers 294A/294B traverse the first and second pathways 236/237 they generate radial and angular movements of the torque lever 299 and/or the gear block 262. These longitudinal and latitudinal movements of the torque lever 299 and/or gear block 262 allow for and/or generate the pivot movements of the torque lever 299, and/or gear block 262. In at least one example, a spacer 246 can be utilized to support and/or engage the torque lever 299.

The torque lever pivot post 288 and the gear block pivot void 297 interact to generate forces that cause the gear block 262 to engage and/or disengage from the output element 250. The movement of a gear block 262, in at least one example, is a cyclical, annular or closed loop movement that may have a generally rectangular, elliptical, circular, square, conical, oval, ovoid, truncated circular pattern, or any combination thereof, design specified pattern of movement.

For example, a gear block interface surface 263 can engage and/or disengage from an output element interface surface. The gear block 262 will move in a cyclical manner as a result of the pivot movements of the torque lever 299 and cam followers 294A/294B. In at least one version, the gear block can have four positions. A first position 228 (or transitioning position) allows for the gear block to traverse or move to a new position to begin a new rotation of the output element 250. The second position 226 (or engaged or positive bias movement position) allows for the gear block to generate a rotational or pulling force 228 on the output element 250. The third position 225 (or neutral or balanced position) may allow the gear block 262 to be in a position to engage, rotate, or disengage from the output element interface surface with no forces generated on the output element. The fourth position 227 (i.e., reverse tension or negative bias configuration) allows for a tension to be placed on the output element 250 to assist in the prevention and/or elimination of backlash of the output element 250.

The cam element guide 216 can be interfaced with the output element 250 through a rotational support, ball bearing assembly, and/or set of ball bearings (not illustrated) that can be placed between the cam element guide circumferential surface 217 and the output element circumferential surface 251.

As shown in the embodiment depicted in the Figures, the plurality of cam-actuated gear block assemblies 260 transfer power from an input or rotating device (not illustrated) to an output element 250. In a preferred embodiment, each gear block assembly 260 includes a gear block 262 having an interface surface 263 (e.g., a plurality of projections or teeth 266) which correspond to a complementary output element interface surface 254 (e.g., projections or gear teeth) configured on an outer circumferential surface 251 of the output element 250. The present invention comprises not only the preferred gear teeth as depicted, but also any complementary arrangement such as pins and holes or even friction fit surfaces.

While the output element 250 is depicted as a single circular ring, it is understood that the output element 250 may comprise two circular rings held apart by spacer elements (not illustrated). The output element 250 includes apertures or holes 258 for attaching to an output shaft or power takeoff (not illustrated). In addition, it is understood that the inner circumference 251 of the output element 250 may also comprise a surface to interface with some other gear train mechanism.

In addition, it is understood that the gear block 262 may include a divider/alignment block (not illustrated) dividing the interface surface 263 into two separate sections. The variant of the gear block 262 featuring the alignment block (not illustrated) is particularly suitable to embodiments which feature output elements 250 comprised of circular rings.

The gear blocks 262 of the present invention are specifically designed to enable a greater surface area (e.g., greater number of gear teeth) to engage the output element 250 at any given time, thereby spreading the stresses associated therein across a greater area. By dramatically increasing the contact area between the gear block 262 and the output element 250 at any given time the mechanical stress level is significantly decreased. In addition, the gear block 262 assemblies 260 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 262 against the output element 250 are distributed across a greater area, the gear block 262 may be manufactured of lighter-weight materials, which are typically less expensive and easier to manufacture, with no degradation in reliability.

For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism of the present invention is adaptable to a broad range of applications that were previously impractical because of weight and space limitations.

The cam element 230 can be coupled to an input device, power source, or other rotating device (not illustrated) by means of an shaft, gears, belts, magnetic fields, friction fit, or other means of coupling. Power generated by an input device, power source, or other rotating device (not illustrated) can be transferred to a shaft, gears, belts, magnetic fields, friction fit, or other means of coupling, which causes the cam element 230 to rotate about the central axis 206. The cam assembly 230 includes along its planar surface a plurality of unique pathways or grooves which each interface with the cam follower(s) 294 of a gear block assembly 260 so that as the cam element 230 rotates, the movement of the gear block 262 is controlled in two dimensions in accordance with a certain design parameter. By varying the radius of the pathway or grooves on the cam element 230 the gear block assemblies 260 drive respective gear block(s) 262 through a two-dimensional circuit in response to rotation of the cam element 230. Broadly speaking, the two-dimensional circuit includes urging the gear block 262 to engage the output element 250 and move or rotate the output element 250 a specified distance prior to disengaging from the output element 250, and returning back the specified distance to again reengage the output element 250 once again and repeat the process. The travel path or circuit of each gear block 262 is controlled by adjusting the size, height, length and configuration of the torque lever(s) 299, gear block(s) 262, and/or cam follower(s) 294 and altering the pathways or grooves formed in the cam element 230.

For example, the pivotal connections may further include torsional spring elements (not shown) which bias the torque lever 299, and/or gear block 262 so that the cam follower 294 maintains contact with the surface of its respective pathway or groove 236, 237 formed in the planar surface 235 of the cam element 230 throughout the rotation cycle of the cam element 230. Alternatively or in addition, a ring spring connecting all of the gear blocks 262 in a gear train may be used as a biasing mechanism in accordance with the present invention.

The gear block assemblies 260 are biased and/or secured so that each cam follower 294 maintains contact with the surface of its respective pathway or groove formed in the cam element 230 throughout the rotation cycle of the cam element 230. For example, cam follower 294A maintains contact with the surface of a first pathway 236, and cam follow 294B maintains contact with the surface of a second pathway 237. Each pathway has a unique circumference, the radius of which varies over the course of the pathway.

The first pathway 236 has a first radius $r_1$ at one part of its circuit that is greater than a second radius $r_2$ at another part of its circuit. This creates a unique, undulating path for each pathway as the cam element 230 rotates. While the cam element 230 depicted in the Figures, appears to be a single disc or unit having a plurality of pathways or grooves formed in the planar surface 235 of the cam element 230, it is understood that the cam element 230 may also comprise a plurality of separate discs, each having a unique pathway formed in its planar or circumferential surface, which are mechanically coupled to one another to assemble a single cam assembly 230.

With reference to FIGS. 12A, 12B, 12C, 13, and 14, by varying the radius of each pathway or groove 236, 237 on the cam element 230, torque lever(s) 299 drive their respective gear block(s) 262 through a two-dimensional circuit in response to rotation of the cam element 230. In general, the two-dimensional circuit 239 includes urging the gear block 262 to engage the output element 250 and move or rotate the output element 250 a specified distance prior to disengaging form the output element 250, and returning back the same specified distance to again reengage the output element 250 once again and repeat the process. It is understood that the two-dimensional circuit 239 depicted in the drawings is not to scale and is somewhat exaggerated to illustrate the general principal of the invention. For example, the distance A-B would typically be much smaller than depicted. The travel path or circuit 239 of each gear block 262 is controlled by adjusting the size and configuration of the torque lever(s) 299, gear block(s) 262, and/or altering the pathways or grooves 236, 237 formed in the cam element 230.

When adapted to a gearbox mechanism 220, a plurality of gear block assemblies 260 are configured about the central axis 206 of the cam element 230. The cam element 230, in at least one version, may be coupled to a power source (not illustrated) by an output device (not illustrated). As the cam element 230 rotates, the cam follower(s) 294 of the respective torque lever(s) 299 and/or gear block(s) 262 of each gear block assembly 260 maintain contact with a particular pathway or groove 236, 237 formed in the planar surface 235 of the cam element 230. The variance of distance from the center of rotation of the different pathways or grooves 236, 237 of the cam element 230 causes the torque lever(s) 299 pivotally attached to a cam follower(s) 194 to work in concert to move their respective gear block(s) 262 through a predetermined circuit of movement 239. This predetermined circuit of movement 239 of the gear block 260 can be precisely calibrated to meet specific engineering requirements. For example, the torque ratio and speed reduction may be regulated and controlled by adjusting the circuit of movement 239 of each gear block assembly 260.

Numerous embodiments of gearbox mechanisms are possible using the gear block assembly 260 of the present invention. All embodiments of gearbox mechanisms constructed in accordance with the present invention feature a plurality of gear block assemblies 260 configured about the central axis 206 of the cam element 230 and may comprise either an odd or even number of gear block assemblies 260. At least two, and preferably three gear block assemblies are required for a gearbox mechanism of the present invention. The movement of the gear block assemblies 260 typically moves in a rotational series to one another.

However, in a preferred embodiment of the present invention wherein the plurality of gear block assemblies comprises four or more even-number gear block assemblies 260, the gear block assemblies 260 configured on opposing sides of the cam element 230 engage and disengage in unison from the secondary or output element 250. For example, an embodiment of the gearbox mechanism 220 may feature four gear block assemblies 260. Similarly, another embodiment of the gearbox mechanism 220 may feature six gear block assemblies 260. This is accomplished by ensuring that the individual pathways or grooves formed in the planar surface of the cam element are in phase with one another along the planer surface of the cam element.

It will now be evident to those skilled in the art that there has been described herein an improved gearbox mechanism. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A gearbox mechanism comprising:
a cam assembly removably coupled to a rotating device, the cam assembly having a first pathway and a second pathway formed into a planar surface of the cam assembly, and rotatable around a central axis when rotated by the rotating device;
an output element coaxially configured with the cam assembly, removably coupled to an output device, the output element having an output element interface surface on a circumferential surface of the output element; and
at least one cam-actuated gear block assembly comprising:
a gear block having a gear block interface surface;
a torque lever pivotally coupled to the gear block;
a first cam follower rotatably coupled to the gear block; and
a second cam follower rotatably coupled to the torque lever.

2. The gearbox mechanism of claim 1, wherein the cam assembly is removably coupled to the rotating device by a fastener.

3. The gearbox mechanism of claim 1, wherein the cam assembly is removably coupled to the rotating device by a friction or geometric connection.

4. The gearbox mechanism of claim 1, wherein the rotating device is a motor.

5. The gearbox mechanism of claim 1, wherein the rotating device is an energy producing device.

6. The gearbox mechanism of claim 1, wherein the first pathway and the second pathway are in the same plane.

7. The gearbox mechanism of claim 1, wherein the first pathway and the second pathway are in separate planes along the central axis.

8. The gearbox mechanism of claim 1, wherein the output element interface surface is a set of gear teeth.

9. The gearbox mechanism of claim 1, wherein the output element interface surface extends inwardly towards the central axis.

10. The gearbox mechanism of claim 1, wherein the output element interface surface extends outwardly away from the central axis.

11. A cam-actuated gear block assembly comprising:
a gear block having a gear block interface surface;
a torque lever pivotally coupled to the gear block;
a first cam follower rotatably coupled to the gear block; and
a second cam follower rotatably coupled to the torque lever;
wherein the gear block has at least one pivot point;
wherein the torque lever has at least one pivot point.

12. The cam-actuated gear block assembly of claim 11, wherein the gear block interface surface extends towards a central axis.

13. The cam-actuated gear block assembly of claim 11, wherein the gear block interface surface extends outwardly from a central axis.

14. The cam-actuated gear block assembly of claim 11, wherein the first cam follower follows a first pathway of a cam assembly.

15. The cam-actuated gear block assembly of claim 11, wherein the second cam follower follows a second pathway of a cam assembly.

16. The cam-actuated gear block assembly of claim 11, wherein the gear block pivots along the at least one pivot point based on the position of the first cam follower.

17. The cam-actuated gear block assembly of claim 11, wherein the torque lever pivots along the at least one pivot point based on the position of the second cam follower.

18. The cam-actuated gear block assembly of claim 11, wherein gear block moves through a two-dimensional circuit based on pivoting of the gear block and the torque lever.

19. The cam-actuated gear block assembly of claim 18, wherein said two-dimensional circuit is a cyclical, annular or closed loop movement that has a rectangular, elliptical, circular, square, conical, oval, ovoid, truncated circular pattern, or any combination thereof, design specified pattern of movement.

20. The cam-actuated gear block assembly of claim 11, wherein the gear block interface surface engages with an output element interface surface during a pattern of rotation to generate movement of an output element.

21. A method of operating a gearbox mechanism comprising:
rotating a cam assembly having a first pathway and a second pathway;
a first cam follower coupled to a gear block following the first pathway;
a second cam follower coupled to a torque lever following the second pathway;
pivoting the gear block based on the movements of the first cam follower;
pivoting a torque lever based on the movements of the second cam follower;
moving the gear block in correlation to the pivoting of the torque lever and the gear block;
interfacing an interfacing surface of the gear block with an interfacing surface of an output element; and
causing a rotational movement of the output element based on the interfacing of the gear block and the output element.

22. The method of operating of claim 21, wherein the cam assembly is rotated by a rotating device.

23. The method of operating of claim 21, wherein the first pathway is generally circular.

24. The method of operating of claim 21, wherein the second pathway is generally circular.

25. The method of operating of claim 21, wherein the first pathway is closer to a central axis than the second pathway.

26. The method of operating of claim 21, wherein the pivoting of the gear block and the pivoting of the torque lever generate a movement pattern for the gear block.

27. The method of operating of claim 21, wherein the interfacing occurs when the gear block generally moves outwardly from a central axis during its pivoting.

28. The method of operating of claim 21, wherein the interfacing occurs when the gear block generally moves towards a central axis during its pivoting.

29. The method of operating of claim 21, wherein the causing a rotational movement further comprises pushing the output element based on the interfacing of the gear block and output element.

30. The method of operating of claim 21, wherein the causing a rotational movement further comprises pulling the output element based on the interfacing of the gear block and the output element.

* * * * *